United States Patent
Nakamaru

(10) Patent No.: US 8,472,035 B2
(45) Date of Patent: Jun. 25, 2013

(54) IMAGE PROCESSING APPARATUS, IMAGE PROCESSING SYSTEM, AND COMPUTER READABLE MEDIUM

(75) Inventor: Akihiko Nakamaru, Kanagawa (JP)

(73) Assignee: Fuji Xerox, Co., Ltd., Tokyo (JP)

( * ) Notice: Subject to any disclaimer, the term of this patent is extended or adjusted under 35 U.S.C. 154(b) by 291 days.

(21) Appl. No.: 13/087,781

(22) Filed: Apr. 15, 2011

(65) Prior Publication Data
US 2012/0081726 A1 Apr. 5, 2012

(30) Foreign Application Priority Data
Oct. 1, 2010 (JP) .................................. 2010-223959

(51) Int. Cl.
*G06K 15/00* (2006.01)
*G03G 15/00* (2006.01)
(52) U.S. Cl.
USPC .............................. 358/1.12; 101/2; 358/1.18
(58) Field of Classification Search
USPC ................................................. 358/1.1–1.18
See application file for complete search history.

(56) References Cited

U.S. PATENT DOCUMENTS
4,706,099 A * 11/1987 Suzuki .......................... 347/262

FOREIGN PATENT DOCUMENTS
JP A-2001-260455 9/2001

* cited by examiner

*Primary Examiner* — King Poon
*Assistant Examiner* — Ibrahim Siddo
(74) *Attorney, Agent, or Firm* — Oliff & Berridge, PLC

(57) ABSTRACT

An image processing apparatus includes the following elements. An image information generator generates, in response to an instruction, print image information to print plural pieces of image information in parallel in plural columns. A division manager divides the print image information into regions, each region having a length equal to the greatest common divisor of lengths of the image information. A manager manages, every time a printing operation is performed, the regions subjected to the printing operation such that the regions are divided into print guaranteed regions and print non-guaranteed regions. A print restart region determining unit determines, upon detection of an occurrence of an abnormality during the printing operation, a print restart region after recovery from the abnormality is completed on the basis of the print guaranteed regions and the regions of the print image information.

8 Claims, 19 Drawing Sheets

FIG. 9                125

| DIVISION MANAGEMENT TABLE ||||
| BAND POINTER (Bpn) | START ADDRESS | PAGE BOUNDARY INFORMATION [PRESENCE OF PAGE BOUNDARY = "1"] ||
| | | LEFT COLUMN | RIGHT COLUMN |
| --- | --- | --- | --- |
| Bp1 | ADDRESS y0 | | |
| Bp2 | ADDRESS y1 | | |
| Bp3 | ADDRESS y2 | "1" | |
| Bp4 | ADDRESS y3 | | "1" |
| Bp5 | ADDRESS y4 | "1" | |
| Bp6 | ADDRESS y5 | | |
| Bp7 | ADDRESS y6 | "1" | "1" |
| Bp8 | ADDRESS y7 | | |
| Bp9 | ADDRESS y8 | "1" | |
| Bp10 | ADDRESS y9 | | "1" |
| Bp11 | ADDRESS y10 | "1" | |
| Bp12 | ADDRESS y11 | | |
| Bp13 | ADDRESS y12 | "1" | "1" |

IMAGE PROCESSING APPARATUS, IMAGE PROCESSING SYSTEM, AND COMPUTER READABLE MEDIUM

CROSS-REFERENCE TO RELATED APPLICATIONS

This application is based on and claims priority under 35 USC 119 from Japanese Patent Application No. 2010-223959 Oct. 1, 2010.

BACKGROUND (i) Technical Field

The present invention relates to image processing apparatuses, image processing systems, and computer readable media.

(ii) Related Art

In printers using continuous paper, such as roll paper, methods for printing, in response to an instruction to print plural pieces of image information in the form of plural print jobs (print information including the plural pieces of image information), the plural pieces of image information in the widthwise direction of one piece of continuous paper in parallel (side by side) are known.

SUMMARY

According to an aspect of the invention, there is provided an image processing apparatus including: an image information generator that generates, in response to an instruction, print image information so as to print plural pieces of image information in parallel in two or more columns on one piece of continuous paper such that the plural pieces of image information are disposed in the widthwise direction of the continuous paper; a division manager that divides the print image information generated by the image information generator into regions, each region having a length equal to the greatest common divisor of lengths along the continuous paper of pages of the plural pieces of image information disposed in the two or more columns in the widthwise direction of the continuous paper, and that manages the regions; a manager that manages, every time a printing operation is performed in units of the regions managed by the division manager, the regions subjected to the printing operation such that the regions are divided into print guaranteed regions on which successful completion of printing is guaranteed and print non-guaranteed regions, continued from the guaranteed regions, on which successful completion of printing is not guaranteed; and a print restart region determining unit that determines, upon detection of an occurrence of an abnormality during the printing operation performed on the basis of the print image information, a print restart region after recovery from the abnormality is completed on the basis of the print guaranteed regions managed by the manager and the regions of the print image information managed by the division manager.

BRIEF DESCRIPTION OF THE DRAWINGS

Exemplary embodiments of the present invention will be described in detail based on the following figures, wherein:

FIG. 9 illustrates an example of the configuration of a division management table that divides and manages parallel print data;

DETAILED DESCRIPTION

Exemplary embodiments of the invention are described below in detail with reference to the accompanying drawings. A description is first given of the overall configuration of the invention through an exemplary embodiment.

Figure 1:
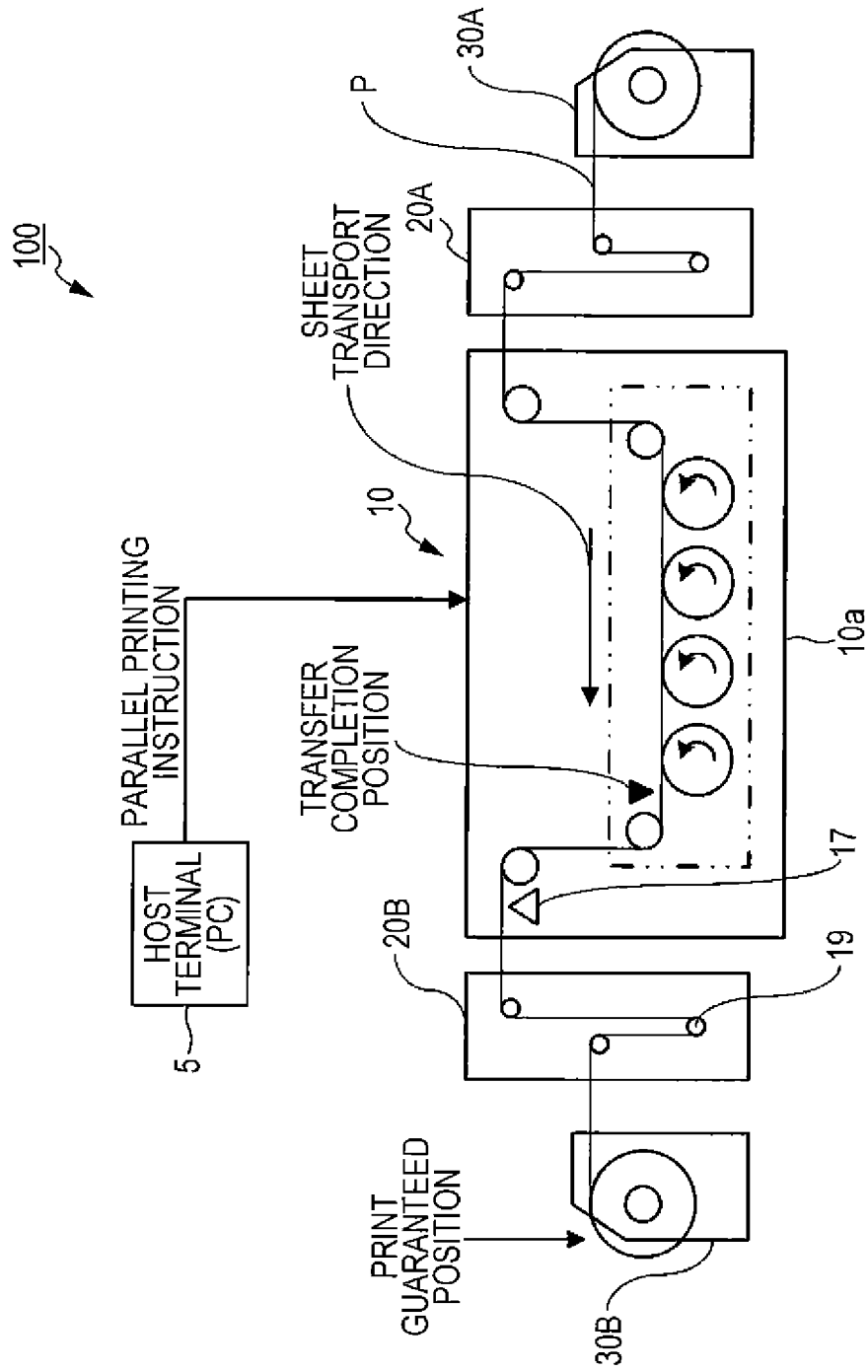
FIG. 1 illustrates the overall configuration of a print system according to an exemplary embodiment of the present invention.

FIG. 1 illustrates the overall configuration of a print system 100 according to an exemplary embodiment of the invention.

The print system 100 includes a host terminal 5, which is a personal computer (PC), and a printer 10 connected to the host terminal 5 so as to print plural jobs (documents) on continuous paper P in parallel on the basis of a parallel printing instruction (command) from the host terminal 5.

The printer 10 includes a printer body 10a, buffer units 20A and 20B, a preprocessing unit 30A, and a postprocessing unit (incorporating unit) 30B.

As the continuous paper P, the printer 10 uses, for example, roll paper. The roll paper is wound around a feed roller of the preprocessing unit 30A and is stretched from the feed roller up to a take-up roller of the postprocessing unit 30B after passing through the buffer unit 20A, a sheet transport path of the printer body 10a, and the buffer unit 20B.

The buffer unit 20A applies tension to the roll paper between the preprocessing unit 30A and the front end of the sheet transport path of the printer body 10a. The buffer unit 20B applies tension to the roll paper between the postprocessing unit 30B and the rear end of the sheet transport path of the printer body 10a.

When an instruction to perform parallel printing is given, the continuous paper P stretched as described above is transported through the sheet transport path within the printer body 10a in the direction indicated by the arrow in FIG. 1, so that parallel printing on plural jobs is performed on the basis of a parallel printing instruction.

The length of the sheet transport path from the rear end of the sheet transport path of the printer body 10a (the position at which transferring of an image is completed, hereinafter referred to as the "transfer completion position") to the winding-start position (print guaranteed position) of the postprocessing unit 30B via the buffer unit 20B is set as the total path length. The total path length is used for calculating the number of bands necessary for determining print guaranteed bands on which successful completion of printing is guaranteed, in case that an abnormality occurs in an image forming device. In this exemplary embodiment, as an example of the abnormality occurring in the image forming device, the occurrence of a paper jam of the continuous paper P is discussed.

In this exemplary embodiment, the print guaranteed position is the winding start position of the postprocessing unit 30B. However, the print guaranteed position is not restricted to this. If the image forming method of the printer 10 is an electrophotographic method, any position after fixing processing may be used as the print guaranteed position. If the image forming method is an ink-jet method, any position after the application of ink to a recording medium, such as paper, may be used as the print guaranteed position. In the ink-jet method, if a drying process after the application of ink is required, the print guaranteed position may be a position after the drying process.

As a mechanism for detecting a paper jam of the continuous paper P, a paper jam detection sensor 17 including a light-emitting element and a light-receiving element is disposed in the sheet transport path downstream of the transfer completion position of the printer body 10a.

If a paper jam of the continuous paper P is detected in a zone from the transfer completion position to the print guaranteed position on the basis of a detection output from the paper jam detection sensor 17, restarting of parallel printing is controlled on the basis of the above-described print guaranteed bands after recovery from a paper jam is completed (if recovery is necessary after the occurrence of an abnormality).

Each of the printer body 10a of the printer 10 and the host terminal 5 includes a central processing unit (CPU), memory devices, which serve as main storage devices, such as a read only memory (ROM) and a random access memory (RAM), a hard disk, which serves as a peripheral storage device, an input interface, and a communication interface.

Figure 2:
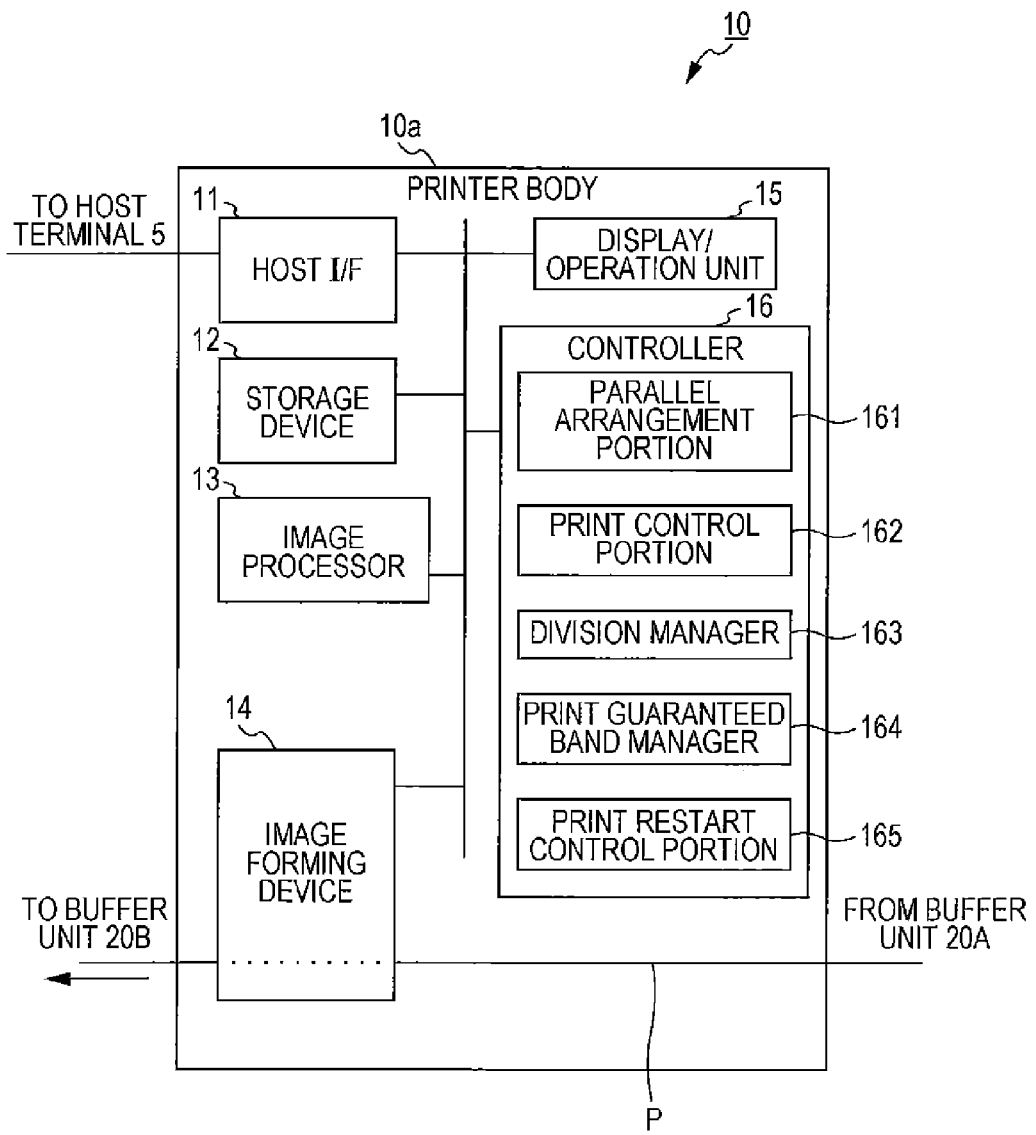
FIG. 2 is a block diagram illustrating the functional configuration of a printer body of a printer.

FIG. 2 is a block diagram illustrating the functional configuration of the printer body 10a of the printer 10.

The printer body 10a includes, as shown in FIG. 2, the following elements. A host interface (I/F) 11 serves as an interface concerning communication with the host terminal 5. A storage device 12 stores various types of information, such as parallel printing instructions (print commands) received from the host terminal 5 via the host I/F 11 and operation programs. An image processor 13 performs image processing on the basis of a parallel printing instruction (print command) received from the host terminal 5 via the host I/F 11 so as to output parallel print data (raster (bitmap) image data). An image forming device 14 forms images of plural jobs and prints the images in parallel on the continuous paper P on the basis of the parallel print data output from the image processor 13. A display/operation unit 15 includes a display for displaying various types of information, such as the operation guidance and the operation state, and an input unit having input devices, such as a keyboard and a mouse. A controller 16 performs overall control on the printer 10.

Figure 3:
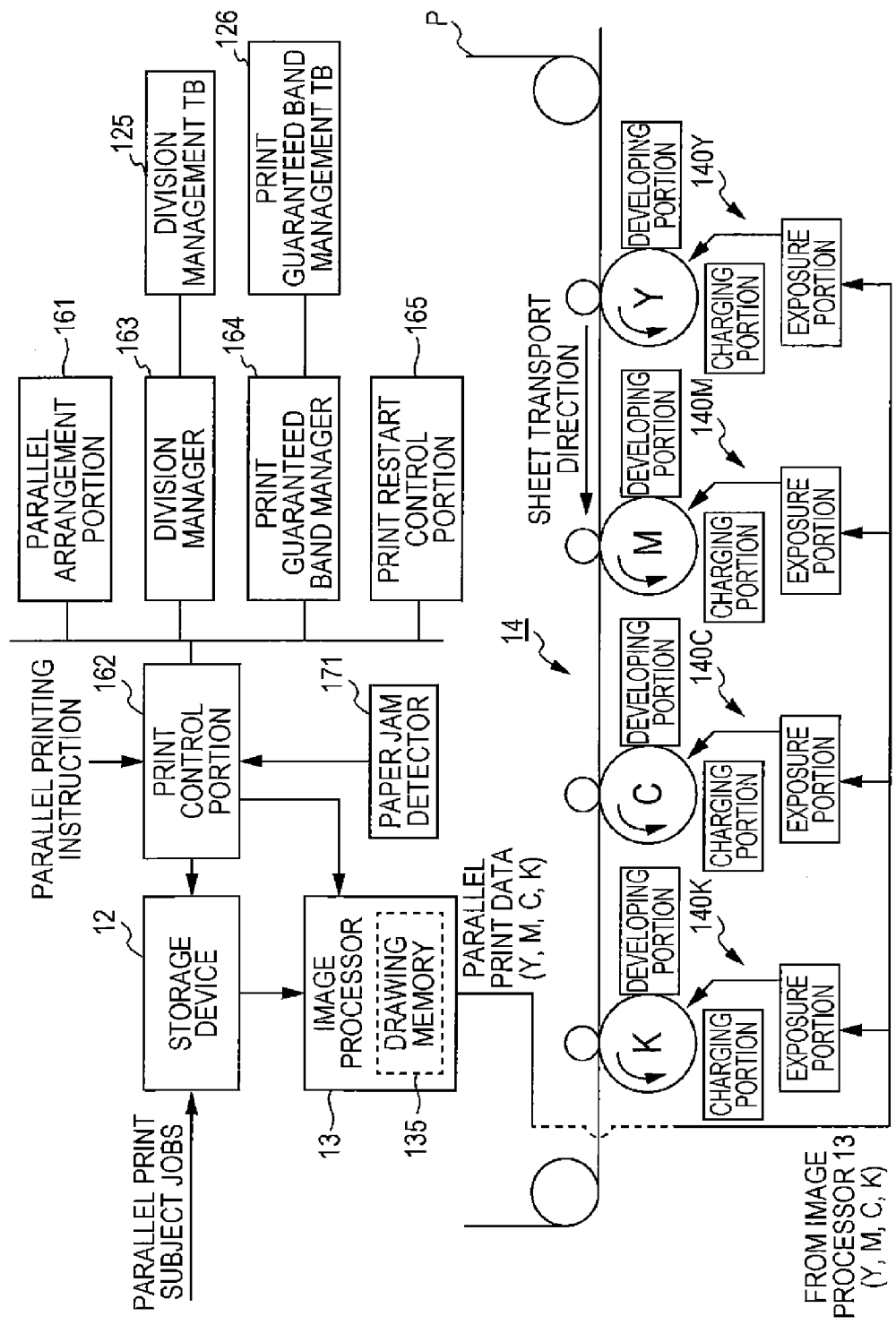
FIG. 3 is a conceptual diagram illustrating details of the configuration of an image forming device together with the functional configuration of a controller.

FIG. 3 is a conceptual diagram illustrating details of the configuration of the image forming device 14 and the functional configuration of the controller 16.

The image forming device 14 includes, as shown in FIG. 3, a sheet transport unit (not shown) for transporting the continuous paper P between the buffer units 20A and 20B in the direction indicated by the arrow. The image forming device 14 also includes, as shown in FIG. 3, image forming units 140 (140Y, 140M, 140C, and 140K) along the sheet transport path used by the sheet transport unit. The image forming units 140Y, 140M, 140C, and 140K respectively form yellow (Y), magenta (M), cyan (C), and black (K) colors of images (toner images) by using Y, M, C, and K colors of toners.

Each of the image forming units 140 (140Y, 140M, 140C, and 140K) further includes an exposure portion, a developing portion, and a charging portion. The image forming units 140 perform image exposure in the exposure portions by the use of laser light on the basis of image signals (print data) of color components (Y, M, C, and K components) corresponding to the image forming units 140Y, 140M, 140C, and 140K, respectively, received from the image processor 13. As a result of exposure, the image forming units 140 form electrostatic latent images associated with the image signals of the corresponding colors on the individual photoconductor drums. Then, the image forming units 140 form toner images of the corresponding colors by supplying the corresponding colors of toners from the developing portions to the electrostatic latent images formed on the photoconductor drums. The toner images of the corresponding colors are then transferred to a transfer belt such that they are superposed on each other, and the superposed image is then fixed on the continuous paper P with the application of heat and pressure to the superposed image. As a result, the image is printed on the continuous paper P.

In the printer 10 of this exemplary embodiment, the controller 16 serves as a function unit that exerts control so that parallel printing is performed. More specifically, on the basis of a parallel printing instruction, received from the host terminal 5, to print plural jobs (documents) in parallel in the widthwise direction of the continuous paper P, the controller 16 controls the above-described image processor 13 and image forming units 140 to position the print jobs in parallel in the columns of the continuous paper P and to print the images of the print jobs. The controller 16 includes, as shown in FIGS. 2 and 3, a parallel arrangement portion 161, a print control portion 162, a division manager 163, a print guaranteed band manager 164, and a print restart control portion 165.

The parallel arrangement portion 161 determines the parallel arrangement of plural jobs in parallel in a predetermined number of columns in the widthwise direction of the continuous paper P on the basis of a parallel printing instruction received from the host terminal 5.

In this exemplary embodiment, it is assumed that the number of columns in which the images of plural print jobs are printed in parallel in the widthwise direction of the continuous paper P is two.

In the following description, the column in which the image of a print job is printed on the left side in the transport direction is referred to as the "reference column", and the column in which the image of a print job is printed on the right side in the transport direction is referred to as the "parallel column".

The print control portion 162 controls the image processor 13 to generate parallel print data from image data (page description language (PDL) data) of each of the print jobs. The parallel print data is to print the images of the print jobs on the continuous paper P in parallel by allowing each job to be positioned in the reference column or the parallel column in the widthwise direction of the continuous paper P in accordance with the arrangement determined by the parallel arrangement portion 161, and by allowing the pages of the corresponding jobs in each column to be continuously positioned in the lengthwise direction of the continuous paper P. The print control portion 162 then controls the image processor 13 to input the generated parallel print data into the image forming device 14 and controls the image forming device 14 to print the parallel print data in parallel.

The parallel print data is raster image (bitmap) data expanded in units of pages of each job, for example, in a drawing memory 135 provided for the image processor 13 in accordance with the arrangement determined by the parallel arrangement portion 161.

Under the control of the print control portion 162, the division manager 163 divides, in the sub-scanning direction of the parallel print data, the parallel print data rendered in the drawing memory 135 by the image processor 13 into bands. Each band has a length equal to the greatest common divisor of the page length of each job disposed in the reference column and the page length of each job disposed in the parallel column.

That is, in this exemplary embodiment, the band is a region having a predetermined length (the length of the greatest common divisor of the page lengths of the individual jobs) obtained by dividing image data in the lengthwise direction (sub-scanning direction). That is, the band is used for managing image data to be subjected to parallel printing.

In this exemplary embodiment, the "page length of a job" is the length of the page of a job (document) disposed in each column in the lengthwise direction (transport direction) of the continuous paper P. That is, the "page length" is the "length" in the sub-scanning direction of the image expanded in the drawing memory 135, and is differentiated from the "width" in the main-scanning direction of the image expanded in the drawing memory 135.

It is hereinafter assumed that the "page length of a job" is the length of the page of a job in the lengthwise direction (sub-scanning direction of the expanded image) of the continuous paper P.

The "page length of a job" may be determined by a page size specified in the job when an instruction to perform parallel printing is given.

A specific method for implementing the above-described management of parallel print data by dividing the parallel print data into units of bands (regions) is as follows. The division manager 163 stores, in a division management table (TB) 125, band pointers that specify the readout band positions in the sub-scanning direction of the parallel print data expanded in the drawing memory 135. The band pointers are stored and managed in association with the sub-scanning direction readout addresses, each having an address length equivalent to the length of each band.

If a paper jam of the continuous paper P occurs while performing parallel printing on the basis of the parallel print data generated by the image processor 13 and expanded in the drawing memory 135 and sequentially read out in units of bands managed by the division manager 163, the print guaranteed band manager 164 determines, by the use of a print guaranteed band management table (TB) 126, until which bands do not require reprinting since printing has successfully been performed on such bands (print guaranteed band).

More specifically, a user, for example, sets the "sheet path length" corresponding to the total length of the sheet from the transfer completion position to the print guaranteed position in the configuration of the printer 10 shown in FIG. 1. Then, the print guaranteed band manager 164 receives the sheet path length set by the user, and determines the bands contained in a range equivalent to the sheet path length starting from the transfer completion position to be "print non-guaranteed bands", and determines the bands beyond such a range to be "print guaranteed bands".

The print restart control portion 165 performs the following control when a paper jam of the continuous paper P has been detected by a paper jam detector 171 on the basis of an output from the paper jam detection sensor 17 (see FIG. 1) while parallel printing is performed in units of bands on the basis of the parallel print data generated by the image processor 13 under the control of the print control portion 162. The print restart control portion 165 determines the print restart band on the basis of the print guaranteed bands managed by the print guaranteed band manager 164 by the use of the print guaranteed band management table 126 and the band position on the parallel print data in the vicinity of the above-described print guaranteed bands, the band position being managed by the division manager 163 by the use of the division management table 125. The print restart control portion 165 then controls the printer 10 to restart the parallel printing from the determined print restart band.

A detailed description is given below, through illustration of exemplary embodiments, of parallel printing processing performed by the print system 100 of this exemplary embodiment.

First Exemplary Embodiment

Figure 4:
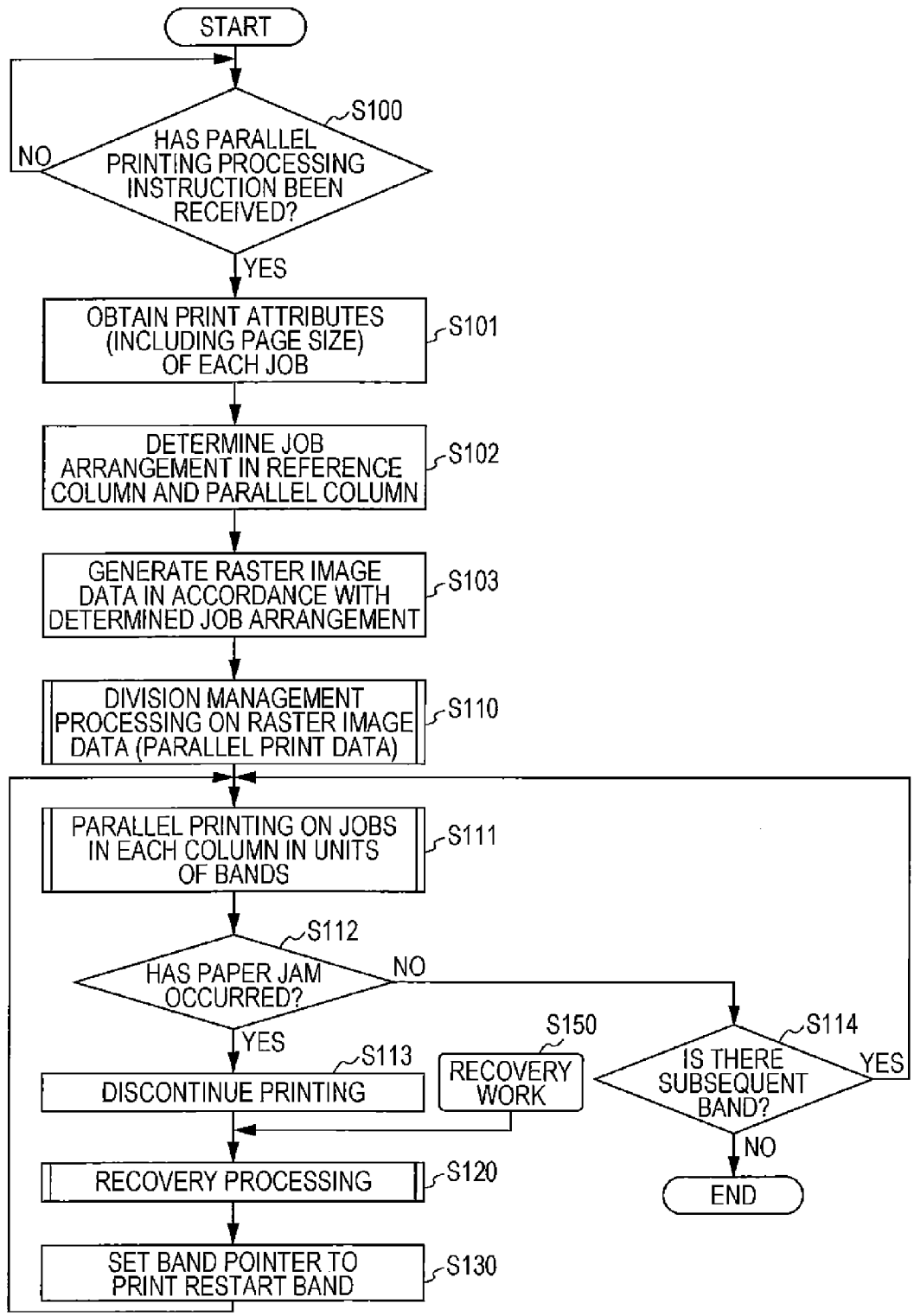
FIG. 4 is a flowchart illustrating a parallel printing processing operation performed by a printer according to a first exemplary embodiment of the present invention.

FIG. 4 is a flowchart illustrating a parallel printing processing operation performed by the printer 10 according to a first exemplary embodiment of the present invention.

It is first determined in step S100 whether a parallel printing instruction has been received from the host terminal 5. If the result of step S100 is YES, in step S101, the parallel arrangement portion 161 obtains printing attributes (page size, number of prints, etc.) of plural jobs to be subjected to parallel printing. Then, in step S102, the parallel arrangement portion 161 determines the arrangement of the jobs, i.e., whether each job is to be positioned in the reference column or in the parallel column.

To deal with continuous paper perforated and foldable for individual pages (fan-fold paper), the physical sheet length for one page of the fan-fold paper may be defined and stored in the storage device 12. One example of the approach to determining the arrangement of jobs in such a case is as follows. Among plural jobs subjected to parallel printing, jobs having a page length equal to the defined physical sheet length are positioned in the reference column, and jobs having a page length other than the physical sheet length are positioned in the parallel column.

Another approach is that the total length of all the jobs subjected to parallel printing is divided by the number of columns (in this example, two, i.e., the reference column and the parallel column), whereby the lengths of the jobs in the individual columns become equal.

Figure 6:
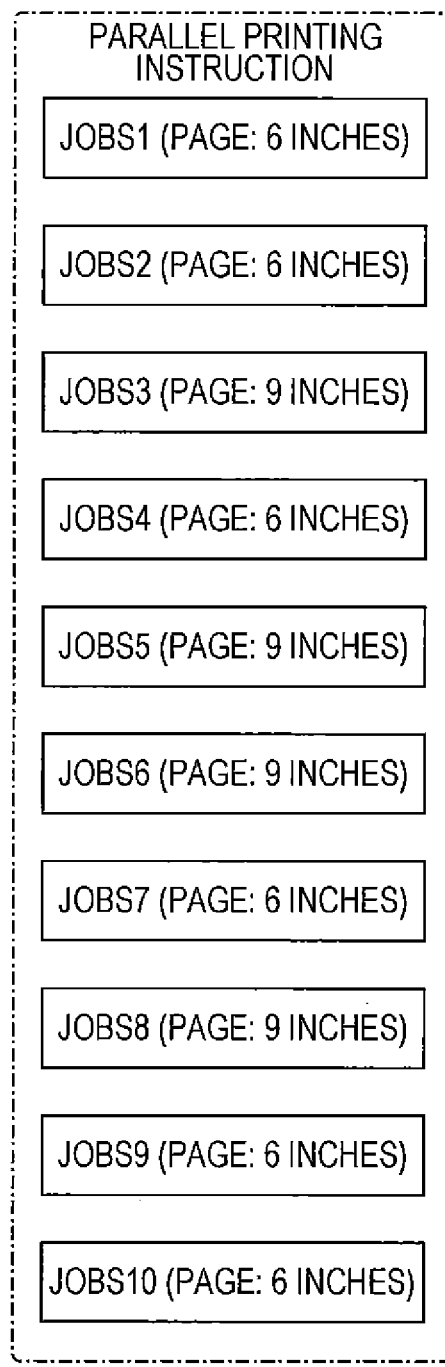
FIG. 6 is a conceptual drawing illustrating a parallel printing instruction in which print jobs 1 through 10 are specified.
Figure 7:
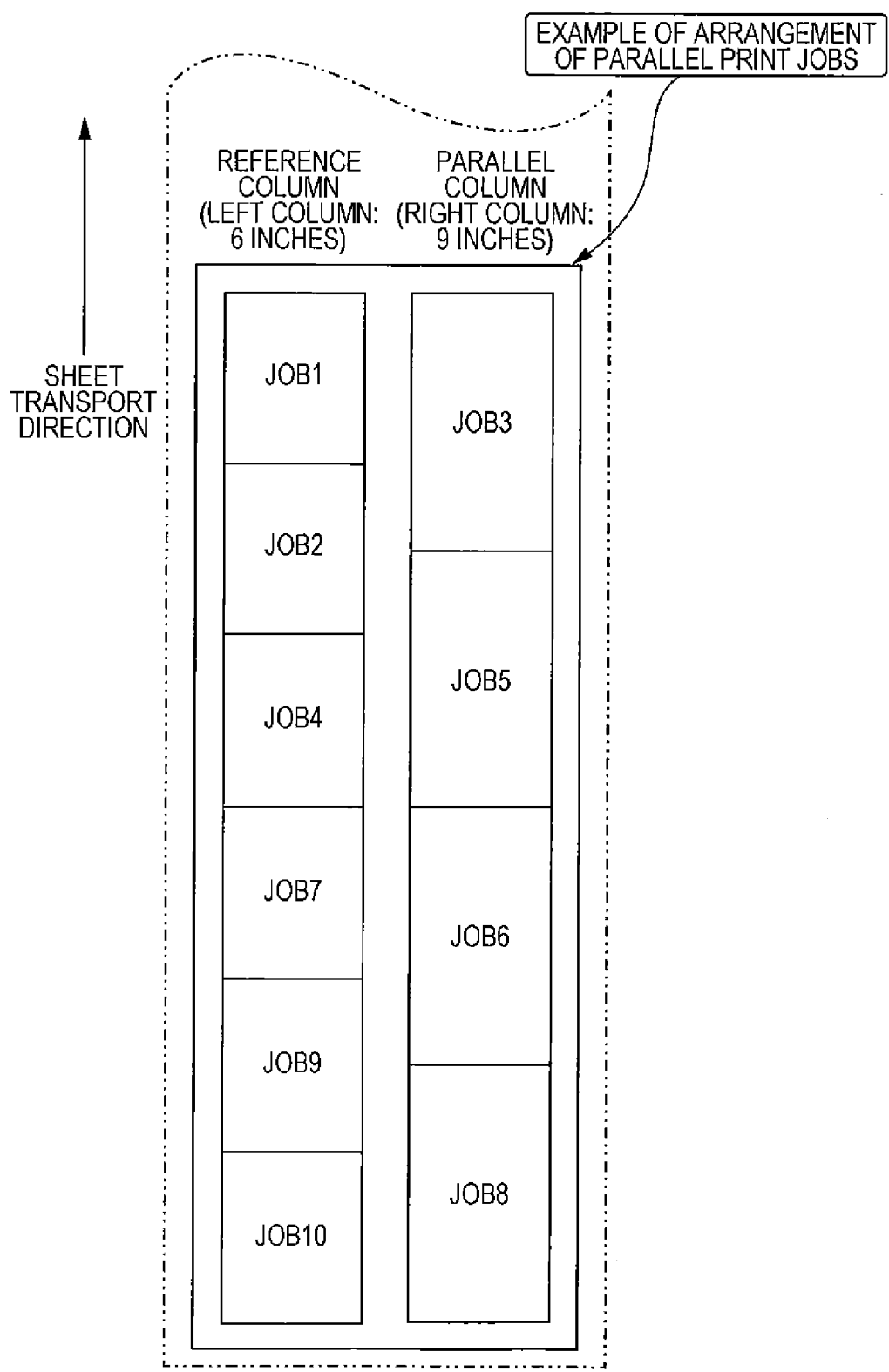
FIG. 7 illustrates an example of the arrangement of jobs subjected to parallel printing based on the parallel printing instruction shown in FIG. 6.

An example of the arrangement of jobs when a parallel printing instruction to print jobs 1 through 10 shown in FIG. 6 is received from the host terminal 5 is shown in FIG. 7.

In this case, the parallel arrangement portion 161 identifies from, for example, the page size specified for each job by the host terminal 5, that the page lengths (which are set to be a1) of the individual pages of jobs (documents) 1, 2, 4, 7, 9, and 10 are all 6 inches and the page lengths (which are set to be a2) of the individual pages of jobs (documents) 3, 5, 6, and 8 are all 9 inches. Then, the parallel arrangement portion 161 determines, as shown in FIG. 7, the arrangement of jobs so that the jobs 1, 2, 4, 7, 9, and 10 having a 6-inch page length are positioned in the reference column (left column) and the jobs 3, 5, 6, and 8 having a 9-inch page length are positioned in the parallel column (right column).

Referring back to FIG. 4, after the arrangement of the jobs is determined in step S102, in step S103, the print control portion 162 controls the image processor 13 to generate parallel print data that allows all the jobs to be subjected to parallel printing in accordance with the job arrangement determined by the parallel arrangement portion 161 and to expand the generated parallel print data in the drawing memory 135.

Figure 8:
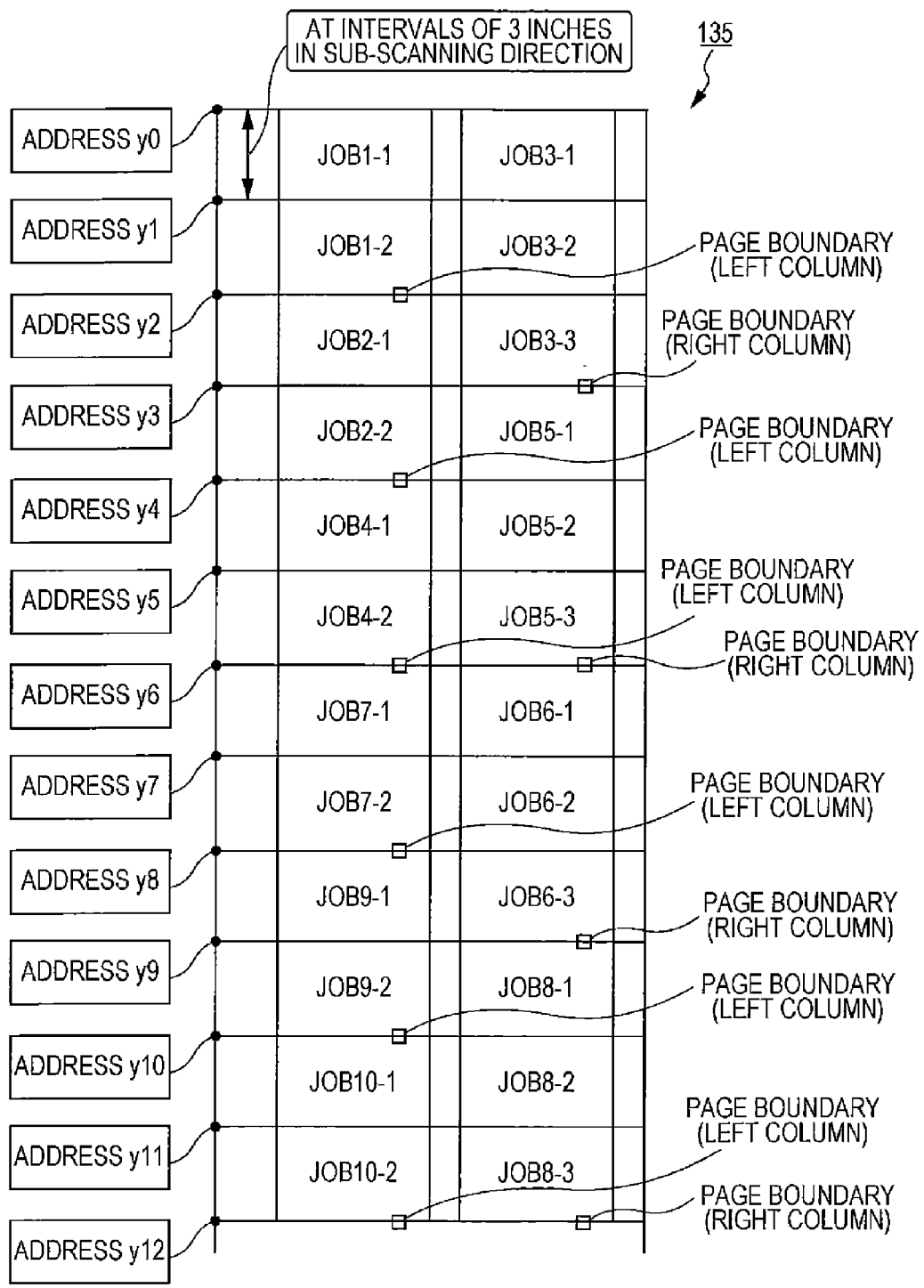
FIG. 8 is a conceptual drawing illustrating an example of the expansion of print parallel data based on the job arrangement shown in FIG. 7.

FIG. 8 is a conceptual diagram illustrating an example of the expansion of parallel print data, in the drawing memory 135, that allows jobs 1 through 10 to be subjected to parallel printing in accordance with the job arrangement shown in FIG. 7.

In the example shown in FIG. 8, all the jobs 1 through 10 subjected to parallel printing are expanded as raster image data. However, depending on the storage capacity of the drawing memory 135, data of the jobs may be sequentially expanded within the storage capacity of the drawing memory 135.

Then, in step S110, in accordance with the above-described image expansion processing, the division manager 163 executes division management processing on the parallel print data expanded in the drawing memory 135 on the basis of the job arrangement determined in step S102 and the page lengths a1 and a2 of the jobs in the reference column and in the parallel column determined in step S102.

Figure 5:
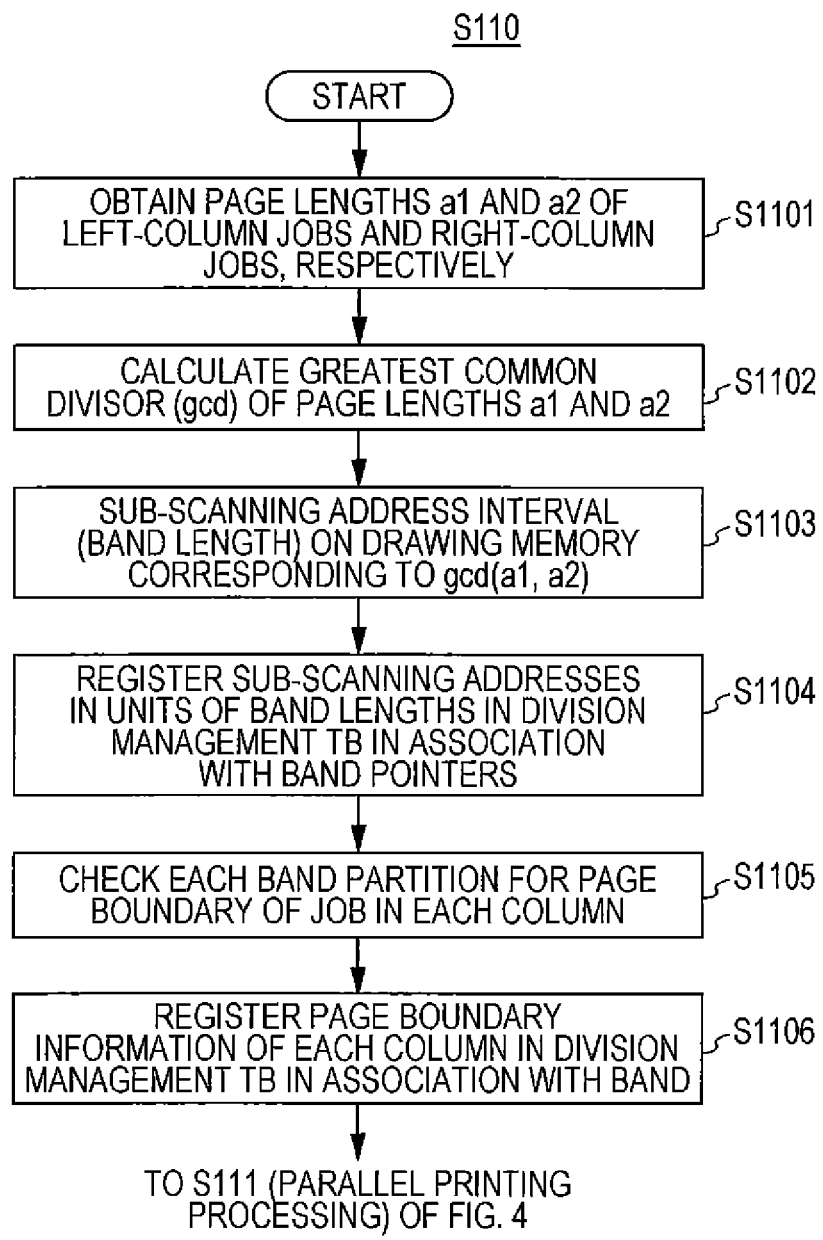
FIG. 5 is a flowchart illustrating division management processing in step S110 of FIG. 4.

FIG. 5 is a flowchart illustrating the division management processing in step S110 of FIG. 4.

In the division management processing, in step S1101, the division manager 163 first obtains the page length a1 (length in the sub-scanning direction) of one page of each job positioned in the reference column and a page length a2 (length in the sub-scanning direction) of one page of each job positioned in the parallel column. Then, in step S1102, the division manager 163 calculates the greatest common divisor (gcd) of the page lengths a1 and a2.

Subsequently, in step S1103, the address length (address interval) in the sub-scanning direction, corresponding to the greatest common divisor [gcd (a1, a2)] calculated in step S102, in the drawing memory 135 is determined as the band length, which is used as the unit for band management.

Then, in step S1104, the sub-scanning addresses in units of the band lengths (address intervals) are stored in the division management table 125 in association with the band pointers specifying the readout band positions in the sub-scanning direction of the parallel print data expanded in the drawing memory 135.

In step S1105, the division manager 163 sequentially checks, on the basis of the job arrangement determined by the parallel arrangement portion 161 and the band length determined in step S1103, each band partition (band pointer) of the parallel print data expanded in the drawing memory 135 for the presence of a page boundary in the reference column or the parallel column.

Subsequently, in step S1106, if a page boundary has been detected in one of or both the columns, the value representing the presence of a page boundary, for example, "1", is set in page boundary information of the left column or the right column corresponding to the band partition (band pointer) in the division management table 125. If a page boundary has not been detected in any of the columns, the value representing the non-presence of a page boundary, for example, 0, is set in the corresponding page boundary information.

Division management processing performed on the print jobs having the job arrangement shown in FIG. 7 is described below by way of a specific example.

In this specific example, a description is given of a case where the division management table 125 shown in FIG. 9 for managing the division of parallel print data is constructed under the following situations: a parallel printing instruction to print the jobs 1 through 10 shown in FIG. 6 is given; the arrangement of the jobs in the reference column and in the parallel column is determined as shown in FIG. 7, and the parallel print data, such as that shown in FIG. 8, is expanded in the drawing memory 135.

In this case, on the basis of the arrangement of the parallel print jobs 1 through 10 determined as shown in FIG. 7, in step S1101 of FIG. 5, the page length a1 of the jobs 1, 2, 4, 7, 9, and 10 of the reference column and the page length a2 of the jobs 3, 5, 6, and 8 of the parallel column are obtained. That is, the page length a1 and the page length a2 are determined to be 6 inches and 9 inches, respectively. In step S1102, the greatest common divisor of the page lengths a1 and a2 is determined to be 3 inches.

In step S1103, on the basis of the expansion of the print jobs in the drawing memory 135 as shown in FIG. 8 in accordance with the job arrangement shown in FIG. 7, sub-scanning addresses y0 through y12 corresponding to the 3-inch interval, which is the greatest common divisor determined in step S1102, in the sub-scanning direction of the drawing memory 135 are determined. In step S1104, the sub-scanning addresses y0 through y12 are registered in the division management table 125 in association with address pointers Bp1 through Bp13, respectively.

Then, in the processing for checking each band partition for a page boundary in step S1105, it is determined that the address positions of the sub-scanning addresses y2, y4, y6, y8, y10, and y12 in the reference column (left column) contain page boundaries, and that the address positions of the sub-scanning addresses y3, y6, y9, and y12 in the parallel column (right column) contain page boundaries.

Thus, in step S1106, in the reference column (left column) of the page boundary information of the division management table 125 shown in FIG. 9, the value "1" representing the presence of a page boundary is registered in association with the band pointers Bp3, Bp5, Bp7, Bp9, Bp11, and Bp13 corresponding to the sub-scanning addresses y2, y4, y6, y8, y10, and y12, respectively.

Also, in the parallel column (right column) of the page boundary information of the division management table 125, the value "1" representing the presence of a page boundary is registered in association with the band pointers Bp4, Bp7, Bp10, and Bp13 corresponding to the sub-scanning addresses y3, y6, y9, and y12, respectively.

The value "0" representing the non-presence of a page boundary is not shown in FIG. 9.

With the provision of the division management table 125 in which 3-inch sub-scanning addresses are registered in association with the band pointers Bp1 through Bp13, it is possible to perform parallel printing such that the parallel print data of the jobs 1 through 10 expanded as shown in FIG. 8 is divided into 3-inch bands (regions) in the sub-scanning direction.

By the above-described division management processing shown in FIG. 5, the division management table 125 having the information shown in FIG. 9 by way of example is constructed. Then, the printer 10 shifts to a parallel printing operation in step S111 of FIG. 4.

More specifically, in FIG. 4, after reconstructing the division management table 125 shown in FIG. 9 by the division management processing in step S110, in step S111, while sequentially counting up the band pointer Bp, on the basis of the address stored in the division management table 125 in association with the band pointer Bp, the print control portion 162 performs control so that parallel print data (raster image data) within one band after the address corresponding to the band pointer Bp is read out from the drawing memory 135. In this manner, the print control portion 162 allows all the jobs to be read out from the drawing memory 135 and to be printed in parallel.

Then, in step S112, it is monitored as to whether a paper jam has been detected by the paper jam detector 171 while the parallel printing processing is performed, on the basis of the band pointer Bp, in each unit band having a width from the reference column to the parallel column.

If it is determined in step S112 that a paper jam has not been detected, it is determined in step S114 whether there is a subsequent band pointer. If the result of step S114 is YES, the process returns to step S111 in which the parallel printing processing is continued on the parallel print data in the drawing memory 135 within one band after the address corresponding to the band pointer. If it is determined in step S114 that there is no subsequent band pointer, the parallel printing processing is completed.

On the other hand, if it is determined in step S112 that a paper jam has been detected by the paper jam detector 171 after completing the parallel printing processing on the parallel print data within the corresponding band in step S111, the process proceeds to step S113. In step S113, the print control portion 162 discontinues the parallel printing processing on the band corresponding to the band pointer Bp indicated when a paper jam has occurred.

Thereafter, the printer 10 is in the standby position until a print restart instruction is given after completing recovery work (e.g., clearing a paper jam) performed by the user in step S150.

If a print restart instruction is given while the printer 10 is in the standby position, in step S120, the print restart control portion 165 performs print restart (recovery) processing to determine from which band is suitable for restarting the parallel printing processing after tracing back the print guaranteed zone in which successful completion of printing is guaranteed when the paper jam has occurred. That is, the print restart control portion 165 determines the print restart band.

Upon completing the print restart (recovery) processing in step S120, in step S130, the print control portion 162 sets the band pointer to the print restart band determined in the recovery processing. Then, the process returns to step S111, and the parallel printing processing is restarted from the print restart band indicated by the band pointer.

Figure 10:
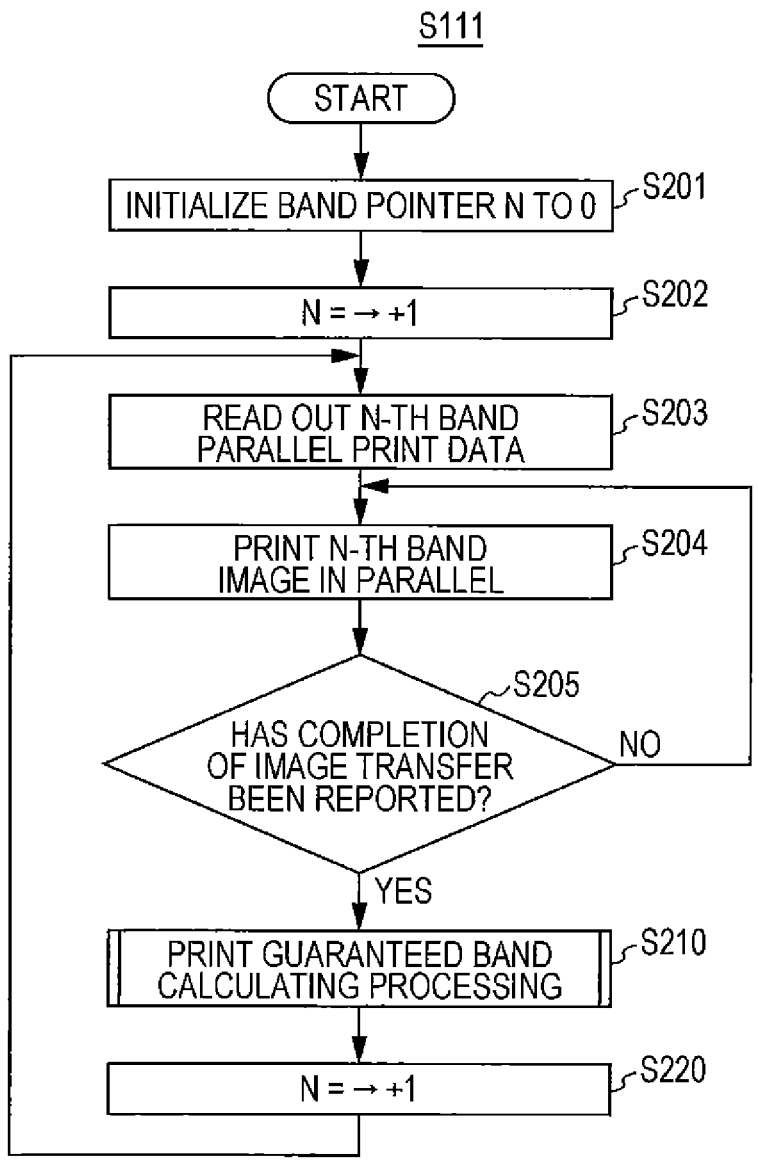
FIG. 10 is a flowchart illustrating details of parallel printing processing in step S111 of FIG. 4.

FIG. 10 is a flowchart illustrating details of the parallel printing processing in step S111 of FIG. 4.

In this parallel printing processing, in step S201, the print control portion 162 first initializes the value of the band pointer N to 0. Then, in step S202, the print control portion 162 increments the band pointer N by one. In step S203, the parallel print data corresponding to the incremented band pointer N is read out from the drawing memory 135. In step S204, the N-th band image is printed on the basis of the read parallel print data.

In step S205, it is monitored as to whether the completion of printing (image transfer) on the N-band image has been reported. If the result of step S205 is YES, the process proceeds to print guaranteed band calculating processing in step S210.

In this print guaranteed band calculating processing, if a band which has been subjected to the image transfer operation at the transfer completion position of the image forming device 14 shown in FIG. 1 has already passed the print guaranteed position on the continuous paper P taken up by the take-up roller of the postprocessing unit 30B, such a band is registered as a print guaranteed band. Bands which have been subjected to the image transfer operation and which are contained from the transfer completion position to the print guaranteed position are treated as print non-guaranteed bands. The print guaranteed band calculating processing is described in detail later with reference to FIG. 11.

After completing the print guaranteed band calculating processing in step S210, in step S220, the print control portion 162 increments the band pointer N and returns to step S203.

With the parallel printing processing in step S111 of FIG. 10, the parallel print data in the reference column and in the parallel column expanded in the drawing memory 135 in accordance with the arrangement determined by the parallel arrangement portion 161 is printed in units of bands in the order indicated by the band pointer N.

Figure 11:
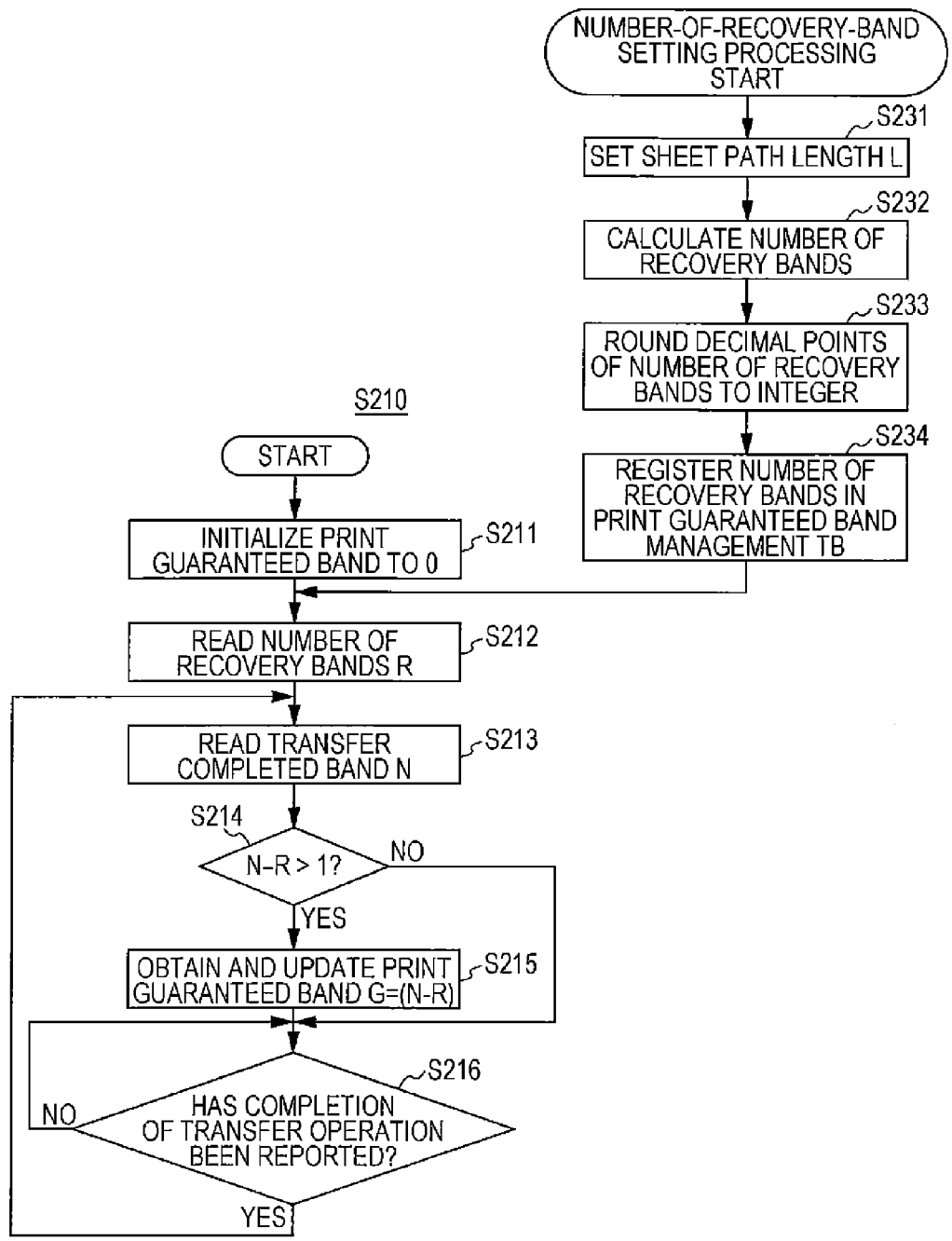
FIG. 11 is a flowchart illustrating details of print guaranteed band calculating processing in step S210 of FIG. 10.

FIG. 11 is a flowchart illustrating details of the print guaranteed band calculating processing in step S210 of FIG. 10.

In order to perform print guaranteed band calculating processing, it is necessary to set the number of recovery bands in advance.

In the number-of-recovery-bands setting processing shown at the top right of FIG. 11, in step S231, the print guaranteed band manager 164 receives the input of the sheet path length L from the user using the display/operation unit 15, and sets the input sheet path length L.

Alternatively, the sheet path length L may be determined from the state of the buffer unit 20B upon the occurrence of an abnormality of the image forming device 14. The buffer unit 20B, as well as the buffer unit 20A, is also used for adjusting tension of paper, and the sheet path length L may be determined from the positional relationship of a tension adjusting mechanism 19 within the buffer unit 20B shown in FIG. 1. The tension adjusting mechanism 19 is moved in the vertical direction in FIG. 1 so as to adjust the tension of paper.

The sheet path length L is, for example, in the configuration of the print system 100 shown in FIG. 1, equivalent to the length from the image transfer completion position of the image forming unit (in this example, the image forming unit 140K) which is disposed in the final position in the image forming process to the take-up position (print guaranteed position) of the postprocessing unit 30B in the downstream direction.

Then, in step S232, the print guaranteed band manager 164 divides the sheet path length L by the band length (division management unit for parallel print data: 3 inches in the example shown in FIG. 8) determined in the above-described division management processing in step S110 of FIG. 4 so as to determine the number of recovery bands R.

In step S233, if the number of recovery bands R determined in step S232 is calculated to have a decimal point, it is rounded to an integer.

Figures 12A, 12B:
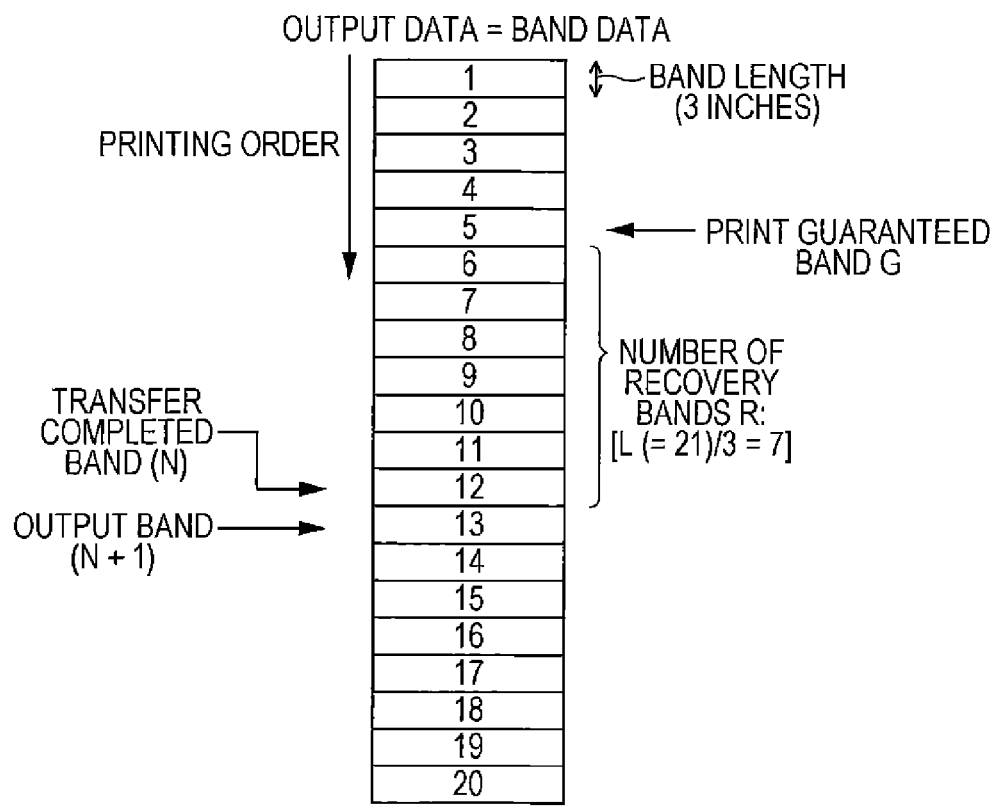
FIG. 12A illustrates the content and items of registration information in a print guaranteed band management table.
FIG. 12B is a conceptual drawing illustrating a band management operation performed by the use of the pint guaranteed band management table shown in FIG. 12A.

Subsequently, in step S234, the print guarantee band manager 164 registers the number of recovery bands R determined in step S232 or S233 in the print guaranteed band management table 126. As shown in FIG. 12A, the print guaranteed band management table 126 contains plural items of information, such as the band length, which is the division management unit, the number of recovery bands R, the output band (N+1), the transfer completed band (N), and the print guaranteed band G.

In step S211 of FIG. 11, in order to execute print guaranteed band calculating processing in the state in which the number of recovery bands R is registered in the print guaranteed band management table 126, the value of the print guaranteed band G is first initialized to 0.

Then, in step S212, the print guaranteed band manager 164 reads the registered number of recovery bands R from the print guaranteed band management table 126 and stores the number of recovery bands R in the print guaranteed band manager 164. In step S213, the print guaranteed band manager 164 reads the transfer completed band N. It is then checked in step S214 whether N−R>1.

If the result of step S214 is NO, the process proceeds to step S216. If the result of step S214 is YES, in step S215, the print guaranteed band G of the print guaranteed band management table 126 is updated to the calculated value (N−R). Then, the process proceeds to step S216.

In step S216, it is checked as to whether the completion of the transfer of the band (i.e., N-th band) indicated by the currently set band pointer N (which is greater than the band pointer N corresponding to the transfer completed band N by one) has been reported. If the outcome of step S216 is YES, the process returns to step S213. In step S213, the transfer completed band N is read again, and in step S214, it is checked again as to whether N−R>1.

Steps S213 through S216 are continued while the parallel printing processing is being performed by incrementing the band pointer N. During the parallel printing processing, as the transfer completed band becomes increased one by one, the print guaranteed band G in the print guaranteed band management table 126 becomes also increased one by one.

A specific example of the management of the print guaranteed band G performed by the print guaranteed band calculating processing by the use of the print guaranteed band management table 126 is described below with reference to FIGS. 12A and 12B.

FIG. 12A illustrates the registration content of the management information of the print guaranteed band management table 126 when the number of recovery bands R is calculated to be 7 (21/3=7) since the sheet path length L is 21 inches and the division management band length is 3 inches.

In this case, in the print guaranteed band management table 126, "3" and "7" are stored in the band length and the number of recovery bands N, respectively, as fixed values.

In this case, assuming that the band indicated by the address pointer N (N=13) is now being printed, "13" and "12" are stored in the output band (N+1) and the transfer completed band (N), respectively.

In this case, from the number of recovery bands R (R=7) and the transfer completed band N (N=12), the print guaranteed band G is calculated to be "5" (G=(N−R)=(12−7)=5), and is stored.

That is, in the print guaranteed band management table 126 shown in FIG. 12A, the following band management operation is implemented. As shown in FIG. 12B, 7 bands contained in a zone from the 12-th band which has already been subjected to the image transfer operation when the 13-th band is being printed to the print guaranteed position, which is away from the 12-th band by an amount equal to the sheet path length L, are treated as the print non-guaranteed bands. The 5-th band, which is ahead of the print non-guaranteed band, i.e., the 6-th band, by one band, is treated as the print guaranteed band G.

In the first exemplary embodiment, since print non-guaranteed bands (the number of recovery bands R) are 7 bands, in step S214 of FIG. 11, when the 8th band has been subjected to the image transfer operation, the print guaranteed band G is calculated to be the first band. Thereafter, every time the parallel printing processing is performed in units of bands, the print guaranteed band G is updated one by one.

With the provision of the print guaranteed band management table 126 and the above-described division management table 125, the print restart control portion 165 can implement the following recovery processing. When the occurrence of a paper jam of the continuous paper P has been detected by the paper jam detector 171 while the parallel printing processing is performed, the print restart control portion 165 reads the print guaranteed band G from the print guaranteed band management table 126. The print restart control portion 165 also specifies the band which contains page boundaries both in the reference column and in the parallel column and which has been output before the print guaranteed band G by referring to the division management table 125, and re-outputs the specified band as the recovery start band.

The recovery processing in step S120 of FIG. 4 is described in detail below with reference to the flowchart of FIG. 13.

Figure 13:
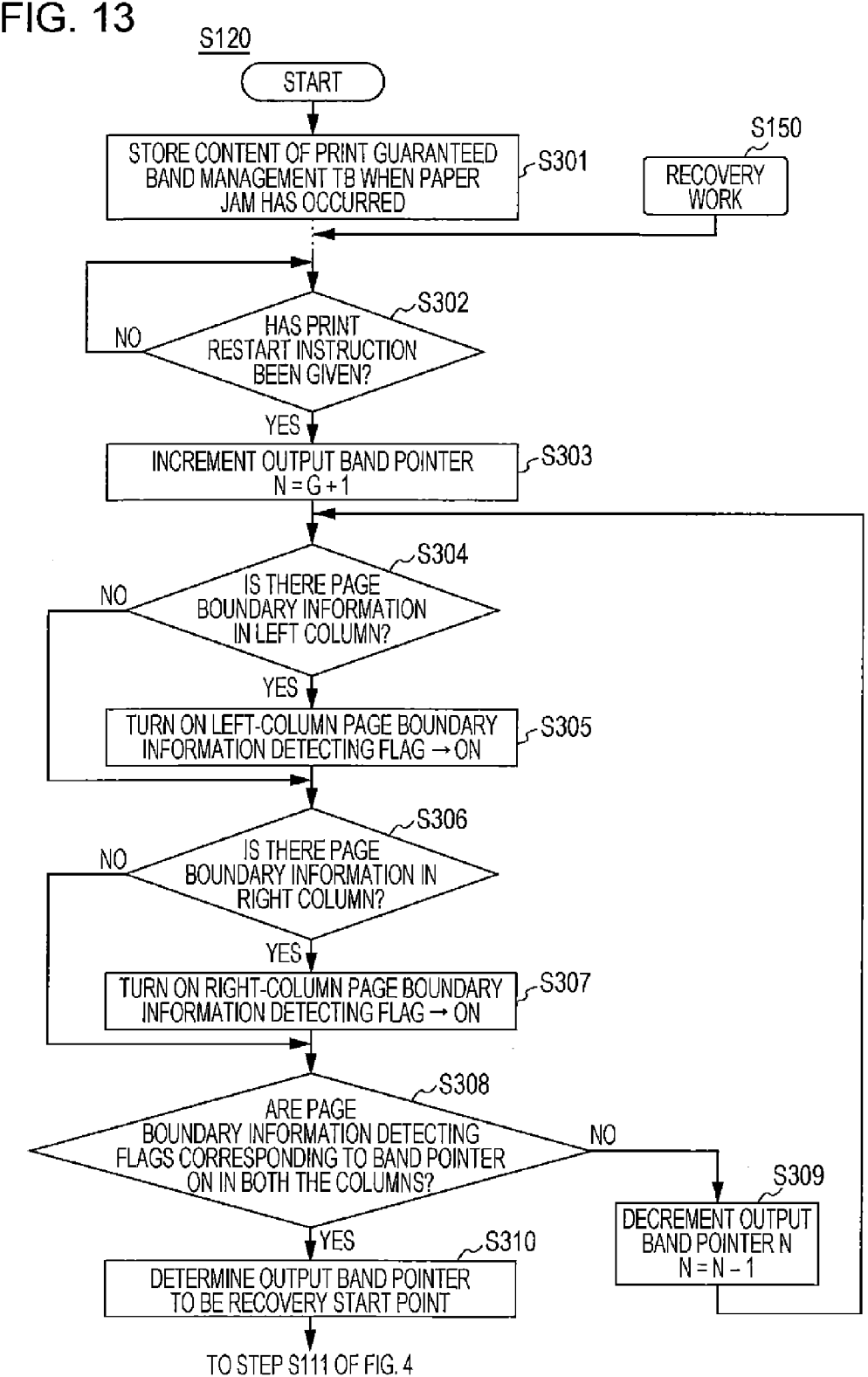
FIG. 13 is a flowchart illustrating details of recovery processing in step S120 of FIG. 4.

In the recovery processing shown in FIG. 13, when the occurrence of a paper jam has been detected in step S112 of FIG. 4 and the parallel printing processing is discontinued in step S113 of FIG. 4, in step S301, the print restart control portion 165 controls the print guaranteed band manager 164 to store the values of the management information in the print guaranteed band management table 126 when a paper jam has occurred. The printer 10 is in the standby position until a print restart instruction is given in step S302 after recovery work for clearing a paper jam has been completed by the user in step S150.

If it is determined in step S302 that a print restart instruction has been given by the user while the printer 10 is in the standby position, the process proceeds to step S303. In step S303, the print restart control portion 165 increments the output band pointer N by one, i.e., the output band pointer N is set to be the value (G+1) by adding one to the print guaranteed band G stored in the print guaranteed band management table 126 when a paper jam has occurred.

Then, in step S304, the print restart control portion 165 refers to the division management table 125 (see FIG. 9) to check the page boundary information column corresponding to the band indicated by the output band pointer N (N=G+1) set in step S303. The print restart control portion 165 then determines in step S304 whether the page boundary information (in this example, "1") is stored in the left column (reference column).

If the outcome of step S304 is NO, the process proceeds to step S306.

If the outcome of step S304 is YES, in step S305, a reference-column page boundary information detecting flag is turned ON. The process then proceeds to step S306.

In step S306, the print restart control portion 165 checks the page boundary information column corresponding to the band indicated by the output band pointer N(N=G+1) to determine whether the page boundary information is stored in the right column (parallel column).

If the result of step S306 is NO, the process proceeds to step S308. If the result of step S306 is YES, in step S307, a parallel-column page boundary information detecting flag is turned ON. The process then proceeds to step S308.

In step S308, the print restart control portion 165 checks the reference-column page boundary information detecting flag and the parallel-column page boundary information detecting flag corresponding to the output band pointer N (N=G+1) on the basis of the results of steps S304 through S307 to determine whether both the flags are ON.

If the outcome of step S308 is NO, i.e., if one of or none of the reference-column page boundary information detecting flag and the parallel-column page boundary information detecting flag is ON, the process proceeds to step S309. In step S309, both the flags are turned OFF, and the output band pointer N is set to the value (N−1).

Then, the process proceeds to step S304, and steps S304 through S308 are repeated. While it is determined in step S308 that one of or none of the reference-column page boundary information detecting flag and the parallel-column page boundary information detecting flag is ON, the process proceeds to step S309 in which both the flags are initialized and the output band pointer N is decremented one by one. Then, process returns to step S304.

If it is determined in step S308 that both the reference-column page boundary information detecting flag and the parallel-column page boundary information detecting flag are ON, the process proceeds to step S310. In step S310, the output band pointer N is determined to be the recovery start (print start) point, and information concerning this (band pointer Bp(R)) is reported to the print control portion 162.

In step S130 of FIG. 4, the print control portion 162 sets the recovery start point (Bp(R)) reported in step S310 to be the output band pointer N, and restarts the parallel printing in step S111.

The determination of the recovery start point by the above-described recovery processing shown in FIG. 13 is described below by way of a specific example.

Figure 14:
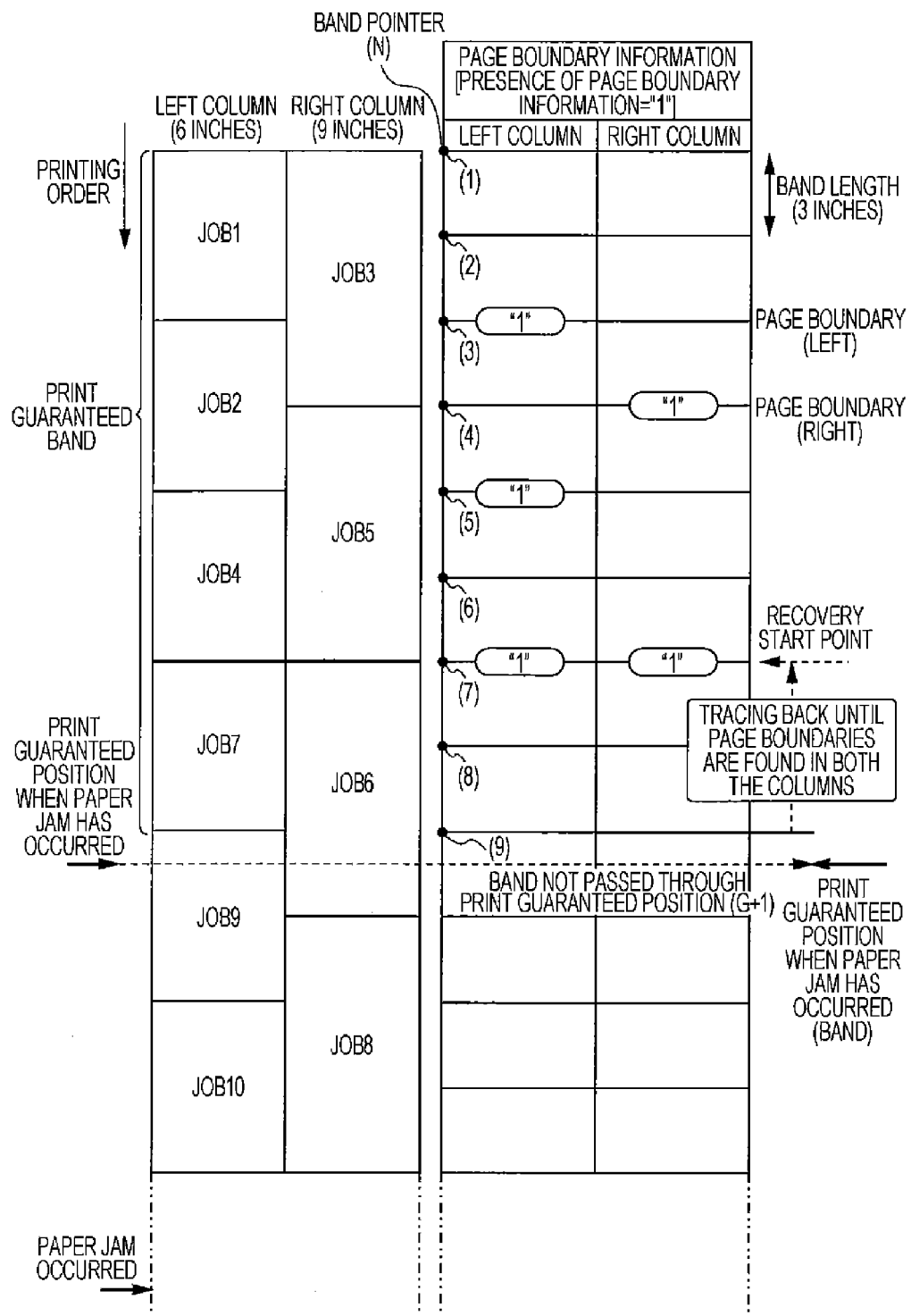
FIG. 14 shows a conceptual image of determining a recovery start point according to the first exemplary embodiment of the present invention.

FIG. 14 shows a conceptual image of determining the recovery start point upon the occurrence of a paper jam of the continuous paper P at a time when the band indicated by the band pointer N (N=9) is passing through the print guaranteed position (see FIG. 1). In this case, it is assumed that parallel printing is performed under the following conditions: a parallel printing instruction to perform parallel printing on jobs 1 through 10 shown in FIG. 6 has been given, and parallel print data (see FIG. 8) in which jobs 1, 2, 4, 7, 9, and 10 having a 6-inch page length are positioned in the reference column and jobs 3, 5, 6, and 8 having a 9-inch page length are positioned in the parallel column is printed in units of 3-inch band lengths.

In this case, the print guaranteed band G managed by the print guaranteed band management table 126 is "8", which corresponds to the 8-th band, which has been subjected to the image transfer operation.

Then, in step S303, the print restart control portion 165 sets the output band pointer N to 9 (N=(G+1)=(8+1)=9), and determines in steps S304 through S308 whether the page boundary information is contained in both the reference (left) column and the parallel (right) column of the band indicated by the band pointer N (N=9).

If it is determined in step S308 that page boundary information is contained in only one of or none of the reference column and the parallel column (for example, page boundary information is contained only in the reference (left) column), the process proceeds to step S309 in which the output band pointer N is decremented by one (N=8). Then, it is determined again in step S308 whether the page boundary information is contained in both the reference column and the parallel column of the band indicated by the band pointer N (N=8).

If the result of step S308 is NO (page boundary information is contained in neither the reference column nor the parallel column), in step S309, the output band pointer N is decremented by one (N=7). Then, it is determined again in step S308 whether the page boundary information is contained in both the reference column and the parallel column of the band indicated by the band pointer N (N=7).

This time it is determined in step S308 that page boundary information is contained in both the reference column and the parallel column, and the process proceeds to step S310. In step S310, the print restart control portion 165 determines the band indicated by the output band pointer N (N=7) to be the recovery start point (Bp(R)).

Subsequently, in step S130 of FIG. 4, the output band pointer N is set to be "7" corresponding to the recovery start point (Bp(R)), and the print control portion 162 restarts the parallel printing from the band indicated by the output band pointer N(N=7).

As described above, in the first exemplary embodiment, if an abnormality which requires recovering from, such as a paper jam, has been detected while performing parallel printing, bands are traced back one by one from the band that is one after the print guaranteed band G stored in the print guaranteed band management table 126, i.e., from the band indicated by the band pointer N(N=G+1). It is then checked as to whether a page boundary is contained in both the reference column (left column) and the parallel column (right column) of each band. If such a band (other than the print non-guaranteed bands) is detected, it is determined to be the print restart band.

With this recovery processing, e.g., in the example shown in FIG. 14, the parallel printing is restarted with the band pointer N (N=7) as the recovery start point, whereby the image of the job 7 in the reference column is re-output.

Figure 15:
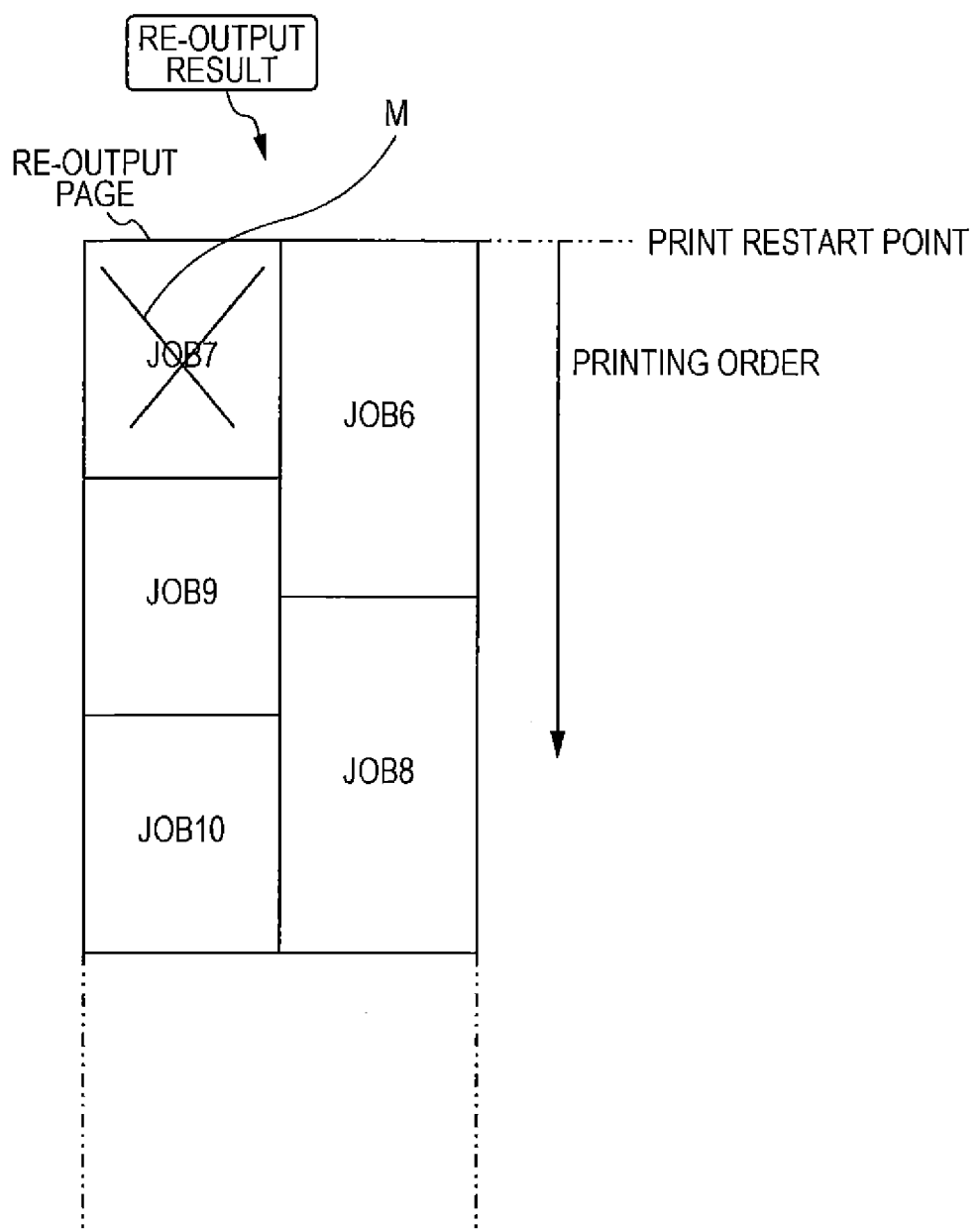
FIG. 15 illustrates an example of a recovery output started from the recovery start point determined in FIG. 14.

In this case, when re-outputting the image of the job 7 from the recovery start point, a not-required page mark indicating that the page of parallel print data of the job 7 is not required, and more specifically, an already printed page indication mark, shown as the cross (x) mark in FIG. 15, indicating the page has been printed twice may be added and output.

To obtain such an output, the following print control function may be added to the print restart control portion 165. When tracing back the bands from the band that is one after the print guaranteed band G (see FIG. 14) upon the occurrence of a paper jam, if a band having page boundary information in one of the columns is detected before a band having page boundary information in both the columns is detected, the band pointer corresponding to the detected band having page boundary information in one of the columns is stored in association with the column. This means that the detection history of the page boundary information detecting flag is recorded. Thereafter, when a band having page boundary information in both the columns, i.e., the recovery start band, is detected, the above-described already printed page indication mark may be added, on the basis of the detection history of the page boundary information detecting flag, to raster image data of the page positioned from the band at the recovery start point to the band in which the above-described page boundary information in one of the columns has been detected.

FIG. 15 is a conceptual drawing illustrating an example of the recovery output when recovery printing is performed on the basis of the recovery start point determining processing shown in FIG. 14.

In order to obtain the recovery output shown in FIG. 15, the print restart control portion 165 performs the following operation when searching for page boundary information by tracing back the bands one by one from the band indicated by the band pointer N(N=9) (steps S303 through S307 of FIG. 13). Upon detecting page boundary information in the left column of the band indicated by the band pointer N(N=9), the print restart control portion 165 turns ON the reference-column page boundary information detecting flag corresponding to the band pointer N(N=9). That is, the detection history of the page boundary information detecting flags is registered. Thereafter, upon detecting page boundary information in both the left and right columns corresponding to the band pointer N(N=7), the print restart control portion 165 turns ON both the reference-column page boundary information detecting flag and the parallel-column page boundary information detecting flag corresponding to the band pointer N(N=7).

Thus, it is determined in step S308 of FIG. 13 that both the flags corresponding to the band pointer N(N=7) are turned ON. Then, in step S310, the band pointer N(N=7) is determined to be the recovery start point.

Processing after step S310 is not shown in FIG. 13. However, after determining the recovery start point in step S310, the detection histories of the page boundary information detecting flags corresponding to the band pointers up to the recovery start point are checked.

As a result of this checking, it is identified that only the reference-column (left-column) page boundary information detecting flag corresponding to the band pointer N(N=9) is ON. It is thus determined that the job 7 having the bands (two bands) from the band indicated by the band pointer N(N=7) determined as the recovery start point to the band indicated by the band pointer N(N=9) in which the page boundary information detecting flag is ON had already been printed when recovery has been completed.

Accordingly, the print restart control portion 165 adds an image corresponding to the already printed page indication mark to the raster image data of the already printed page (job 7), and then, the recovery printing is started from the band at the recovery start point.

As a result, as shown in FIG. 15, printing is restarted from the image at a position at which the forward edge of the job 7 in the left column and the forward edge of the job 6 in the right column are in the same sub-scanning line. Thus, a reprinted output having the already printed page indication mark M added to the job 7 is obtained.

In the example shown in FIG. 15, a cross (x) mark is added. However, the already printed page indication mark may be any mark as long as it allows a user to identify unnecessary pages among the reprinted pages as a result of recovery printing. For example, characters indicating "ALREADY PRINTED" may be added.

Alternatively, a page determined to be a not-required page (page corresponding to the job 7 in the example in FIG. 15) as a result of the above-described processing may be deleted, and then, recovery printing may be started.

The parallel printing processing shown in FIG. 4 is performed when jobs having a 6-inch page length and jobs having a 9-inch page length are arranged in two columns. However, while those jobs are being printed, another parallel printing instruction to print other plural jobs may be given.

Figure 16:
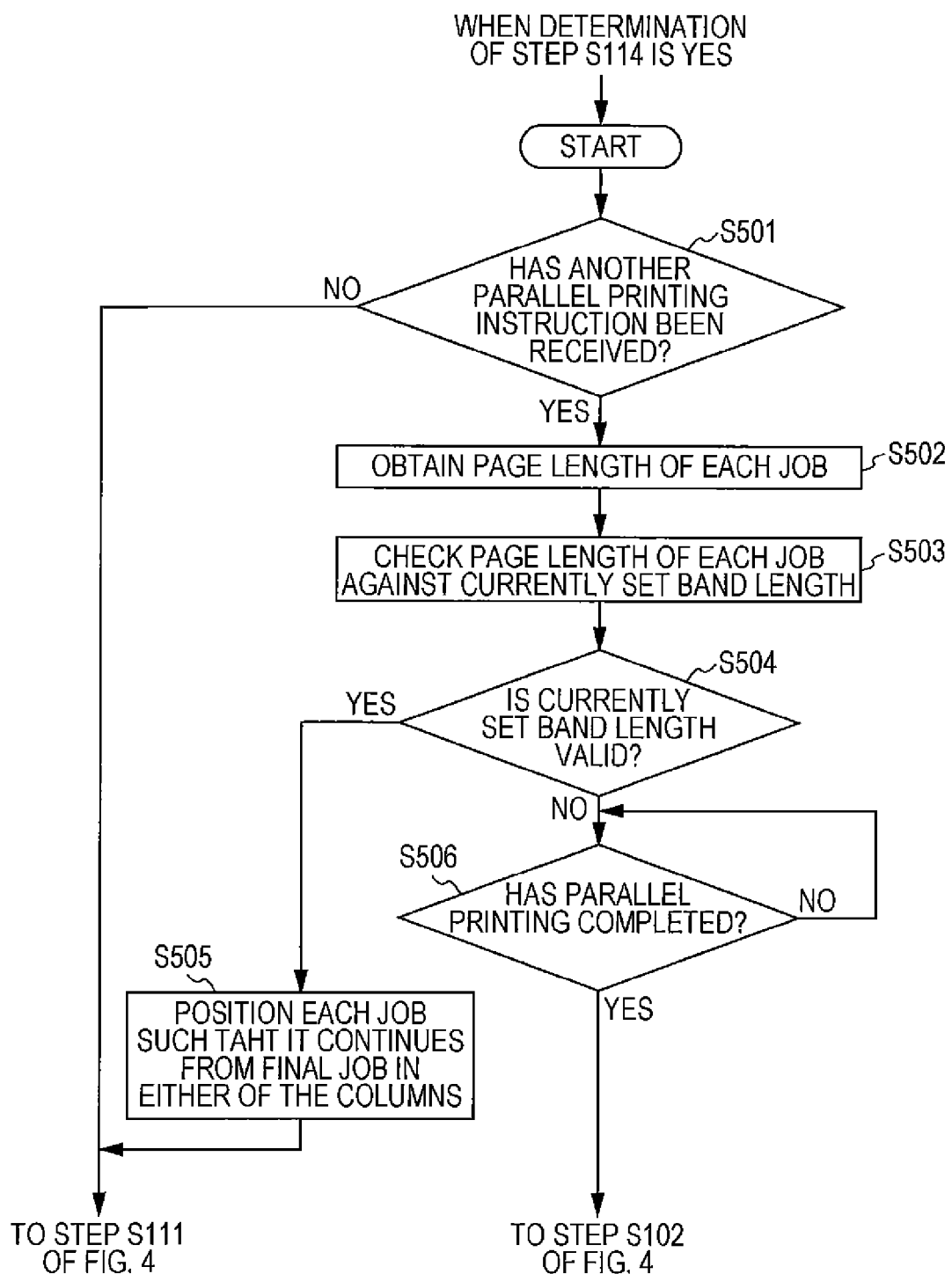
FIG. 16 is a flowchart illustrating processing for receiving another parallel printing instruction while parallel printing is performed according to the first exemplary embodiment of the present invention.

FIG. 16 is a flowchart illustrating processing for receiving another parallel printing instruction while parallel printing is being performed in the printer 10 of the first exemplary embodiment.

The processing shown in FIG. 16 may be inserted after it is determined in step S114 of FIG. 4 that there is a subsequent band.

In this case, it is assumed that parallel printing is being performed on the jobs (for example, jobs 1 through 10 shown in FIG. 6) received in step S100 of FIG. 4 after the series of steps starting from step S101.

While this parallel printing is being performed, every time it is determined in step S112 that the occurrence of a paper jam has not been detected and it is determined in step S114 that there is a subsequent band, the print control portion 162 checks in step S501 as to whether another parallel printing instruction has been received.

If it is determined in step S501 that another parallel printing instruction for other jobs has not been received, the process shifts to the parallel processing for a subsequent band in step S111 of FIG. 4.

If it is determined in step S501 that another parallel printing instruction for other jobs has been received, the process proceeds to step S502. In step S502, the print control portion 162 checks the printing attributes (page size, the number of prints, etc.) based on the received parallel printing instruction so as to obtain the page length of each job.

In step S503, the page length of each page checks against the currently set band length on the basis of the job arrangement of the current parallel printing operation. It is then determined in step S504 whether the currently set band length is valid.

If it is determined in step S504 that the currently set band length is valid (for example, the page length of each of the obtained jobs can be divided by the currently set band length), the process proceeds to step S505. In step S505, the parallel arrangement portion 161 positions each job such that it continues from the final job of the reference column or the parallel column on the basis of the page length obtained in step S502.

Thereafter, the process proceeds to step S111, and parallel printing is performed on the jobs including the jobs arranged in step S505 in units of currently set band lengths.

In contrast, if it is determined in step S504 that the currently set band length is not valid since the page length of each of the jobs obtained in step S501 cannot be divided by the currently set band length, the process proceeds to step S506. In step S506, the parallel print control portion 162 monitors as to whether the parallel printing in execution has completed.

If the result of step S506 is YES, the process proceeds to step S102 of FIG. 4. In step S102, the parallel arrangement portion 161 determines the arrangement of the jobs obtained in step S501 to be positioned in the reference column or in the parallel column.

Thereafter, in step S103, parallel print data for the jobs obtained in step S501 is generated, and in step S110, the band length is calculated on the basis of the greatest common divisor of the page length of the jobs positioned in the reference column and the page length of the jobs positioned in the parallel column. Then, in step S111, parallel printing is executed on the parallel print data in units of the band lengths determined in step S110.

With the processing for receiving another parallel printing instruction shown in FIG. 16, for example, when parallel printing is performed on the jobs 1 through 10 shown in FIG. 6 on the basis of the original parallel printing instruction, if the jobs received in step S501 of FIG. 16 also have a 6-inch page length or a 9-inch page length, the parallel arrangement portion 161 positions the jobs having a 6-inch page length in the reference (left) column and positions the jobs having a 9-inch page length in the parallel (right) column. All the jobs are continued from the final page of the final job in the reference column or in the parallel column. Accordingly, as well as the 10 jobs (jobs 1 through 10 shown in FIGS. 6 through 8) which are currently subjected to parallel printing, the page image of the jobs expanded in the drawing memory 135 on the basis of a new parallel printing instruction is also divided into 3-inch band units. Thus, it is also possible to perform recovery control upon the occurrence of a paper jam.

In contrast, if the jobs received in step S501 on the basis of a new parallel printing instruction have, for example, a 5-inch page length or a 10-inch page length, while parallel printing is being performed on the ten jobs 1 through 10 on the basis of the previous parallel printing instruction, it is determined in step S504 that the currently set band length (3 inches) is not valid. Thus, the parallel arrangement portion 161 determines a new arrangement of the jobs such that, for example, the jobs having a 5-inch page length are positioned in the reference (left) column and the jobs having a 10-inch page length are positioned in the parallel (right) column. Then, the print guaranteed band manager 164 sets the division management band length (5 inches) of the raster image data which is to be subjected to parallel printing on the basis of the new job arrangement. Then, parallel printing in units of the new band lengths can be performed under the control of the print control portion 16.

Second Exemplary Embodiment

The printer 10 configured in accordance with a second exemplary embodiment of the invention is different from that of the first exemplary embodiment in the functional configuration of the print restart control portion 165 of the controller 16 (see FIGS. 2 and 3).

Figure 17:
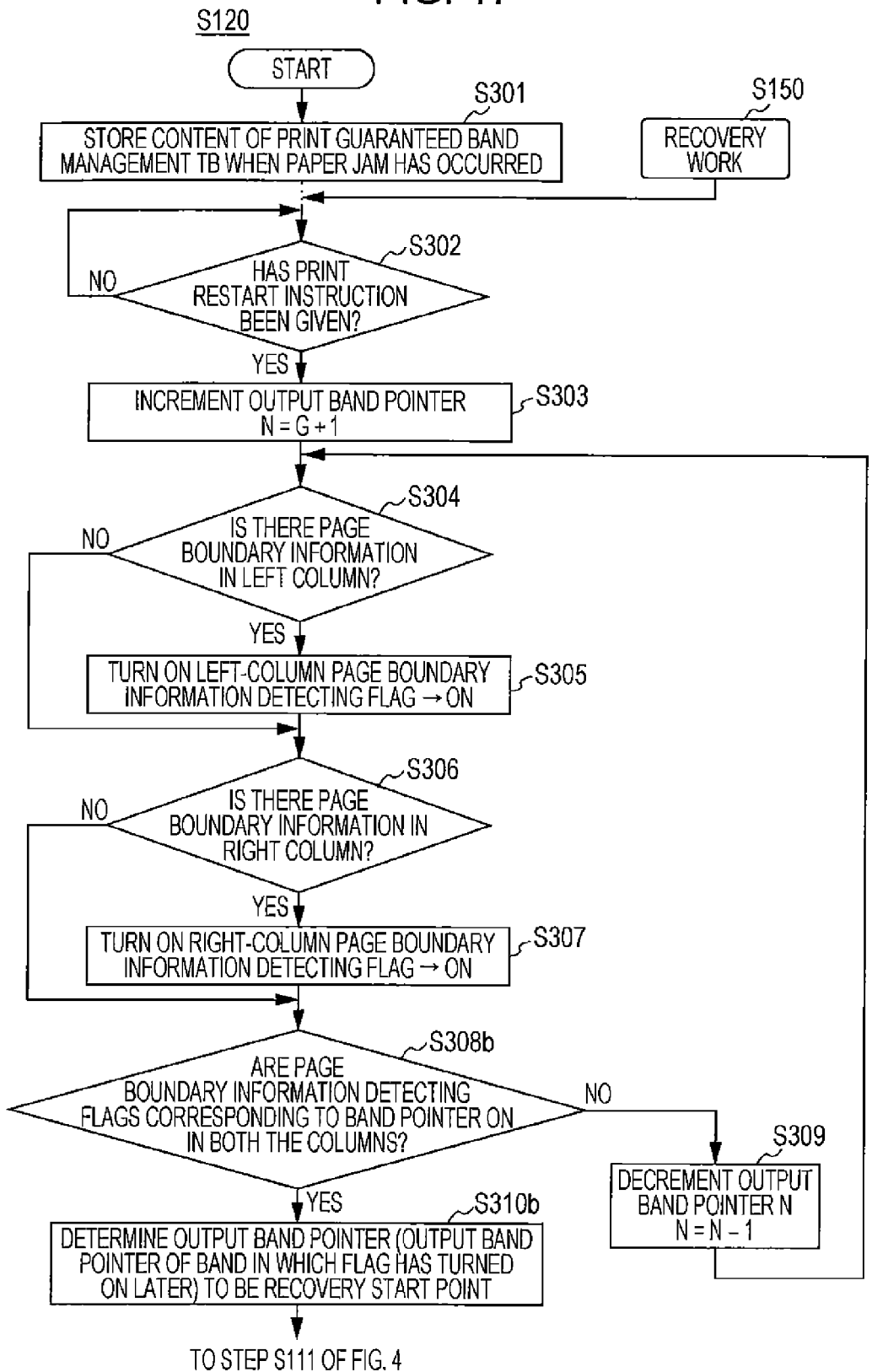
FIG. 17 is a flowchart illustrating details of recovery processing according to a second exemplary embodiment of the present invention.

FIG. 17 is a flowchart illustrating recovery processing performed by a print restart control portion 165b of the printer 10 in accordance with the second exemplary embodiment of the invention.

In FIG. 17, steps similar to those of the recovery processing shown in FIG. 13 of the first exemplary embodiment are designated by like step numbers.

In the recovery processing shown in FIG. 17, while executing steps S304 through S307, upon detecting the presence of page boundary information in either of the reference column and the parallel column, the print restart control portion 165b turns ON the page boundary information detecting flag in the column in which page boundary information has been detected. The process then proceeds to step S308b.

In step S308b, after steps S304 through S307, the print restart control portion 165b checks the reference-column page boundary information detecting flag and the parallel-column page boundary information detecting flag to determine whether both the flags are ON.

If it is determined in step S308b that one of or neither of the flags is ON, in step S309, the output band pointer N is set to be N−1 in the state in which the page boundary information detecting flag (ON) in the reference column or in the parallel column after steps S304 through S307 is stored.

Subsequently, the process returns to step S304, and while it is determined in step S308b that one of or neither of the flags is ON, the output band pointer N is decremented one by one in step S309, and the process returns to step S304.

If it is determined in step S308b that both the flags are ON, the process proceeds to step S310b. In this case, if the page boundary information detecting flag has first been turned ON in one of the columns, and later, if the page boundary information detecting flag has been turned ON in the other column, the band pointer N of the band in which the page boundary information detecting flag has turned ON later is set to be the recovery start (print restart) point.

Thereafter, as in the first exemplary embodiment, the process proceeds to step S130 of FIG. 4. In step S130, the recovery start point [Bp(R)] determined in step S310b is set in the output band pointer N, and parallel processing is restarted in step S111.

The determination of the recovery start point by the above-described recovery processing shown in FIG. 17 is described below by way of a specific example.

Figure 18:
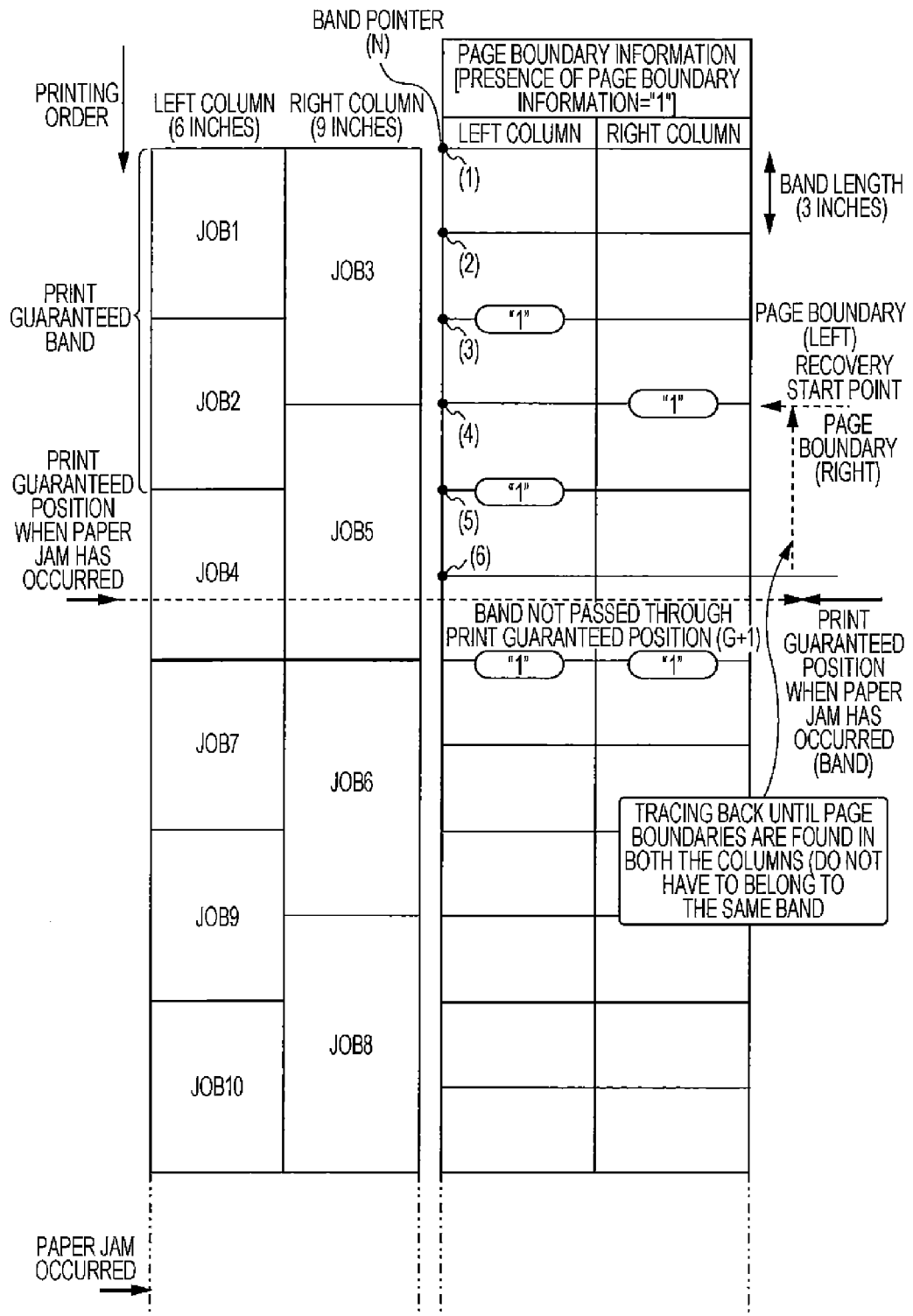
FIG. 18 shows a conceptual image of determining a recovery start point according to the second exemplary embodiment of the present invention.

FIG. 18 shows a conceptual image of determining the recovery start point upon the occurrence of a paper jam of the continuous paper P at a time when the band indicated by the band pointer N (N=6) is passing through the print guaranteed position (see FIG. 1). In this case, it is assumed that parallel printing is performed under the following conditions: a parallel printing instruction to perform parallel printing on jobs 1 through 10 shown in FIG. 6 has been given, and parallel print data (see FIG. 8) in which jobs 1, 2, 4, 7, 9, and 10 having a 6-inch page length are positioned in the reference column and jobs 3, 5, 6, and 8 having a 9-inch page length are positioned in the parallel column is printed in units of 3-inch band lengths.

In this case, the print guaranteed band G shown in the print guaranteed band management table 126 is "5", which corresponds to the 5-th band subjected to the image transfer operation.

Then, in step S303, the print restart control portion 165b sets the output band pointer N to 6 (N=(G+1)=(5+1)=6), and determines in steps S304 through S308b whether the page boundary information is contained in both the reference (left) column and the parallel (right) column of the band indicated by the band pointer N (N=6).

If it is determined in step S308b that page boundary information is contained in neither the reference column nor the parallel column, the process proceeds to step S309 in which the output band pointer N is decremented by one (N=5). Then, it is determined again in step S308b whether the page boundary information is contained in both the reference column and the parallel column of the band indicated by the band pointer N (N=5).

If the result of step S308b is NO (for example, page boundary information is contained only in the reference (left) column), in step S309, the output band pointer N is decremented by one (N=4). Then, it is determined again in step S308b whether the page boundary information is contained in both the reference column and the parallel column of the band indicated by the band pointer N (N=4).

This time it is determined in step S308b that page boundary information is contained in both the reference column and the parallel column, and the process proceeds to step S310b. In step S310b, the print restart control portion 165b determines the band indicated by the output band pointer N (N=4) to be the recovery start point (Bp(R)).

Subsequently, in step S130 of FIG. 4, the output band pointer N is set to be "4" corresponding to the recovery start point (Bp(R)), and the print control portion 162 restarts the parallel printing from the band indicated by the output band pointer N(N=4).

Figure 19:
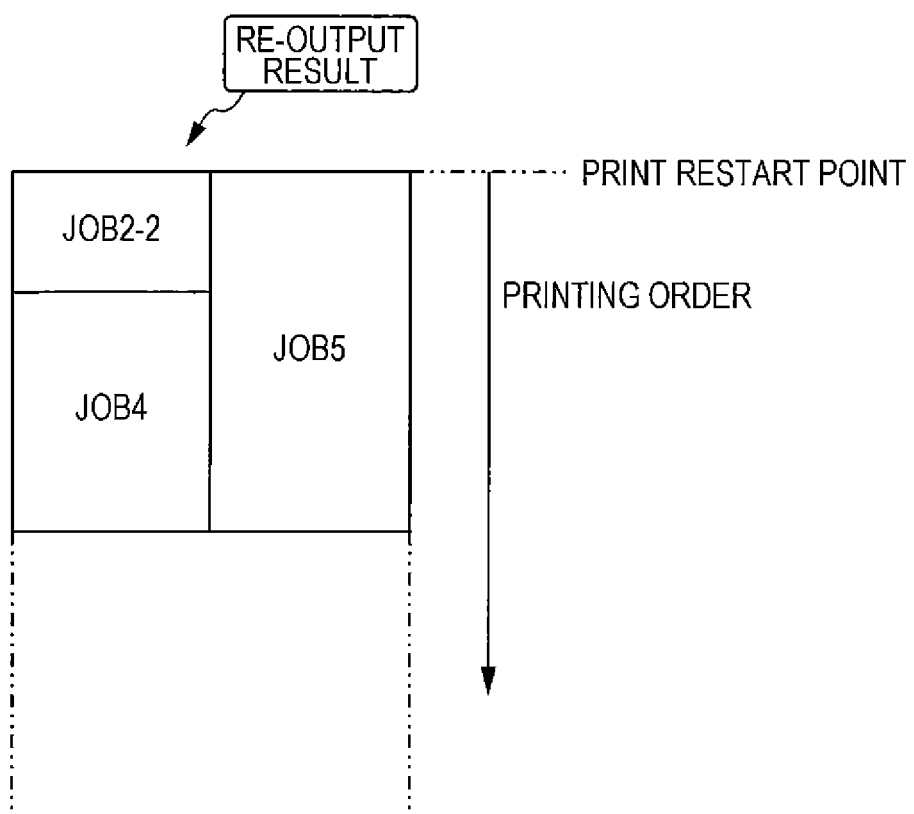
FIG. 19 illustrates an example of a recovery output starting from the recovery start point determined in FIG. 18.

FIG. 19 is a conceptual drawing illustrating an example of the recovery output when recovery printing is performed on the basis of the recovery start point determining processing shown in FIG. 18.

In order to obtain the recovery output shown in FIG. 19, the print restart control portion 165b performs the following operation when searching for page boundary information by tracing back the bands one by one from the band indicated by the band pointer N(N=6) (steps S303 through S309 of FIG. 17). Upon detecting page boundary information in the left column of the band indicated by the band pointer N(N=5), the print restart control portion 165b turns ON the reference-column page boundary information detecting flag corresponding to the band pointer N(N=5). Thereafter, upon detecting page boundary information in the right column corresponding to the band pointer N(N=4), the print restart control portion 165b turns ON the parallel-column page boundary information detecting flag corresponding to the band pointer N(N=4).

Thus, it is determined in step S308b of FIG. 17 that both the flags corresponding to the band pointer N(N=4) are turned ON. Then, in step S310b, the band pointer N(N=4) is determined to be the recovery start point.

Thus, printing is restarted on the parallel print data arranged as shown in FIG. 18 from the band indicated by the band pointer N(N=4) determined to be the recovery start point. Then, as shown in FIG. 19, printing is restarted at a position at which the forward edge of the latter part of the job 2 in the left column and the forward edge of the job 5 in the right column are in the same sub-scanning line, and as a result, a re-output image shown in FIG. 19 is obtained.

As described above, in the second exemplary embodiment, upon detecting the occurrence of a paper jam while executing parallel printing, bands are traced back one by one from the band that is one after the print guaranteed band G stored in the band management table 12, i.e., the band indicated by the band pointer N(N=G+1). It is then checked for the presence of page boundary information in each of the reference column and the parallel column of each band. If there is a band having page boundary information in both the reference column and the parallel column (however, such boundary information in the reference column and that the parallel column do not have to belong to the same band), such a band is determined to be the recovery start band.

The invention is not restricted to the exemplary embodiments described above with reference to the drawings, and various modifications may be made without departing from the scope of the invention.

For example, in the above-described exemplary embodiments, all the documents (jobs) subjected to the parallel printing operation are each formed of one page. However, parallel printing may be performed on documents having plural pages. In this case, an exemplary embodiment of the invention is also applicable to the parallel arrangement, division management, and parallel printing for documents having plural pages.

Also, although, in the above-described exemplary embodiments, roll paper is used as the continuous paper P, another type of continuous paper, such as fan-fold paper, may be used.

Additionally, in the above-described exemplary embodiments, the number of columns in the widthwise direction of the continuous paper P is two. However, an exemplary embodiment of the invention is applicable to parallel printing when parallel data is printed in three or more columns.

In the above-described exemplary embodiments, a printer including a preprocessing unit and a postprocessing unit is used. The postprocessing unit post-processes continuous paper which is supplied from the preprocessing unit and which has plural documents printed in parallel. However, an exemplary embodiment of the invention is not restricted to this type of apparatus, but is also applicable to various types of image processing apparatuses, such as a printer or a copying machine for printing plural documents in a prescribed number of columns by the use of continuous paper (roll paper, fan-fold paper, etc.).

In the above-described exemplary embodiments, an image processing program implemented by a computer including a CPU and a storage device, such as a ROM or a RAM, is installed in an image processing apparatus, such as a printer, for printing plural documents on continuous paper P in a prescribed number of columns in the widthwise direction of the continuous paper P. On the basis of the image processing program, the computer is allowed to function as an image information generator (the print control portion 162 and the image processor 13) that generates parallel print image information, a division manager (division manager 163) that divides the parallel print image information into regions, each region having a length equal to the greatest common divisor of the documents in the individual columns, and that manages the divided regions, a manager (the print guaranteed band manager 164) that manages a print guaranteed region on which successful completion of printing is guaranteed in case of the occurrence of an abnormality which needs restarting printing, and a print restart region determining unit (the print restart control portion 165) that determines the print restart region on the basis of the print guaranteed region managed by the manager and the division management region for the parallel print image information managed by the division manager. However, the image processing program may be stored in a storage medium, such as a compact disc (CD)-ROM.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
an image information generator that generates, in response to an instruction, print image information so as to print a plurality of pieces of image information in parallel in two or more columns on one piece of continuous paper such that the plurality of pieces of image information are disposed in the widthwise direction of the continuous paper;
a division manager that divides the print image information generated by the image information generator into regions, each region having a length equal to the greatest common divisor of lengths along the continuous paper of pages of the plurality of pieces of image information disposed in the two or more columns in the widthwise direction of the continuous paper, and that manages the regions;
a manager that manages, every time a printing operation is performed in units of the regions managed by the division manager, the regions subjected to the printing operation such that the regions are divided into print guaranteed regions on which successful completion of printing is guaranteed and print non-guaranteed regions, continued from the guaranteed regions, on which successful completion of printing is not guaranteed; and a print restart region determining unit that determines, upon detection of an occurrence of an abnormality during the printing operation performed on the basis of the print image information, a print restart region after recovery from the abnormality is completed on the basis of the print guaranteed regions managed by the manager and the regions of the print image information managed by the division manager.

2. The image processing apparatus according to claim 1, wherein the division manager further manages page boundary information indicating that a page boundary is contained in some of the regions of the print image information in each of the two or more columns in association with a page boundary of each of the plurality of pieces of image information in each of the two or more columns.

3. The image processing apparatus according to claim 2, wherein, upon detection of the occurrence of the abnormality during the printing operation, the print restart region determining unit sequentially searches for the page boundary information region by region by starting from a region that is one after a position corresponding to the print guaranteed regions managed by the manager, and determines, as the print restart region, a region in which the page boundary information has been detected in all the two or more columns of the print image information.

4. The image processing apparatus according to claim 3, further comprising:
a determination unit that determines when restarting the printing operation, as an already printed page, an area from the region determined as the print restart region to a region in one of the two or more columns in which the page boundary information has been detected before the print restart region; and
an output controller that controls, when restarting to print the print image information from the print restart region, an output of the print image information by adding a not-required page mark to the already printed page determined by the determination unit so as to indicate that the already printed page is not required.

5. The image processing apparatus according to claim 3, further comprising:
a determination unit that determines when restarting the printing operation, as an already printed page, an area from the region determined as the print restart region to a region in one of the two or more columns in which the page boundary information has been detected before the print restart region; and
an output controller that controls, when restarting to print the print image information from the print restart region, an output of the print image information by deleting the already printed page determined by the determination unit.

6. The image processing apparatus according to claim 2, wherein, upon detection of the occurrence of the abnormality during the printing operation, the print restart region determining unit sequentially searches for the page boundary information region by region by starting from a region that is one after a position corresponding to the print guaranteed regions managed by the manager, and, when the page boundary information has been detected in a region of the print image information in one of the two or more columns, and then, when the page boundary information has been detected sequentially in regions of the print image information in all the remaining columns, the print restart region determining unit determines, as the print restart region, a region of the column in which the page boundary information has been detected lastly.

7. An image processing system comprising:
an instruction device that gives an instruction based on print information to print a plurality of pieces of image information included in the print information;
a feeder device that feeds one piece of continuous paper;
an image processing apparatus that performs image processing for continuously printing the plurality of pieces of image information, in response to the instruction based on the print information given by the instruction device, on the continuous paper fed from the feeder device; and
an incorporating device that incorporates the continuous paper on which the plurality of pieces of image information are continuously printed,
the image processing apparatus including:
an image information generator that generates, in response to the instruction, print image information so as to print a plurality of pieces of image information in parallel in two or more columns on the continuous paper such that the plurality of pieces of image information are disposed in the widthwise direction of the continuous paper;
a division manager that divides the print image information generated by the image information generator into regions, each region having a length equal to the greatest common divisor of lengths along the continuous paper of pages of the plurality of pieces of image information disposed in the two or more columns in the widthwise direction of the continuous paper, and that manages the regions;
a manager that manages, every time a printing operation is performed in units of the regions managed by the division manager, the regions subjected to the printing operation such that the regions are divided into print guaranteed regions on which successful completion of printing is guaranteed and print non-guaranteed regions, continued from the guaranteed regions, on which successful completion of printing is not guaranteed; and
a print restart region determining unit that determines, upon detection of an occurrence of an abnormality during the printing operation performed on the basis of the print image information, a print restart region after recovery from the abnormality is completed on the basis of the print guaranteed regions managed by the manager and the regions of the print image information managed by the division manager.

8. A Non-Transitory computer readable medium storing a program causing a computer to execute a process, the process comprising:
generating, in response to an instruction, print image information so as to print a plurality of pieces of image information in parallel in two or more columns on one piece of continuous paper such that the plurality of pieces of image information are disposed in the widthwise direction of the continuous paper;
dividing the print image information into regions, each region having a length equal to the greatest common divisor of lengths along the continuous paper of pages of the plurality of pieces of image information disposed in the two or more columns in the widthwise direction of the continuous paper, and managing the regions;
managing, every time a printing operation is performed in units of the regions, the regions subjected to the printing operation such that the regions are divided into print guaranteed regions on which successful completion of printing is guaranteed and print non-guaranteed regions, continued from the guaranteed regions, on which successful completion of printing is not guaranteed; and determining, upon detection of an occurrence of an abnormality during the printing operation performed on the basis of the print image information, a print restart region after recovery from the abnormality is completed on the basis of the print guaranteed regions and the regions of the print image information.

\* \* \* \* \*